(12) United States Patent
George et al.

(10) Patent No.: US 10,984,069 B2
(45) Date of Patent: Apr. 20, 2021

(54) GENERATING USER EXPERIENCE INTERFACES BY INTEGRATING ANALYTICS DATA TOGETHER WITH PRODUCT DATA AND AUDIENCE DATA IN A SINGLE DESIGN TOOL

(71) Applicant: Adobe Inc., San Jose, CA (US)

(72) Inventors: William Brandon George, Pleasant Grove, UT (US); Kevin Gary Smith, Lehi, UT (US)

(73) Assignee: ADOBE INC., San Jose, CA (US)

( * ) Notice: Subject to any disclaimer, the term of this patent is extended or adjusted under 35 U.S.C. 154(b) by 116 days.

(21) Appl. No.: 16/255,584

(22) Filed: Jan. 23, 2019

(65) Prior Publication Data
US 2020/0233924 A1 Jul. 23, 2020

(51) Int. Cl.
| | | |
|---|---|---|
| *G06F 16/958* | (2019.01) | |
| *G06Q 30/02* | (2012.01) | |
| *G06Q 30/06* | (2012.01) | |
| *G06F 40/197* | (2020.01) | |
| *G06F 40/14* | (2020.01) | |
| *G06F 16/957* | (2019.01) | |

(52) U.S. Cl.
CPC ........ *G06F 16/958* (2019.01); *G06F 16/9577* (2019.01); *G06F 40/14* (2020.01); *G06F 40/197* (2020.01); *G06Q 30/0201* (2013.01); *G06Q 30/0603* (2013.01)

(58) Field of Classification Search
CPC ...... G06F 16/958; G06F 40/197; G06F 40/14; G06Q 30/0201; G06Q 30/0603
See application file for complete search history.

(56) References Cited

U.S. PATENT DOCUMENTS

| 6,199,099 B1 * | 3/2001 | Gershman | G06F 16/9537 |
| | | | 709/203 |
| 9,087,035 B1 * | 7/2015 | Bandaru | G06F 16/958 |
| 10,534,851 B1 * | 1/2020 | Chan | G06Q 30/0255 |
| 10,585,931 B1 * | 3/2020 | Young | G06F 16/2428 |
| 10,783,405 B2 * | 9/2020 | Rohde | G06N 20/20 |
| 2002/0161673 A1 * | 10/2002 | Lee | G06Q 30/02 |
| | | | 709/224 |
| 2006/0271671 A1 * | 11/2006 | Hansen | G06Q 30/02 |
| | | | 709/224 |

(Continued)

*Primary Examiner* — Ryan Barrett
(74) *Attorney, Agent, or Firm* — Keller Jolley Preece

(57) ABSTRACT

The present disclosure relates to systems, methods, and non-transitory computer readable media for generating webpage design templates based on product information, audience information, and user experience information. For example, the disclosed systems can utilize an internet-based product catalog engine to determine actual product information such as product descriptions and reviews to include within a webpage design template during the design process. The disclosed systems can further generate personalization rules to modify the appearance of a product webpage to accommodate the preferences of different audiences. In addition, the disclosed systems can generate recommendations to modify various design elements based on product information, audience information, and user experience information. Further, the disclosed systems can publish a webpage design template as a product storefront webpage accessible to end users.

20 Claims, 12 Drawing Sheets

(56) References Cited

U.S. PATENT DOCUMENTS

| | | | |
|---|---|---|---|
| 2007/0061412 A1* | 3/2007 | Karidi | G06Q 30/02 709/217 |
| 2008/0109472 A1* | 5/2008 | Underwood | G06F 40/186 |
| 2008/0275980 A1* | 11/2008 | Hansen | H04L 67/02 709/224 |
| 2009/0164315 A1* | 6/2009 | Rothman | G06Q 30/06 705/14.52 |
| 2010/0205551 A1* | 8/2010 | Underwood | G06Q 10/10 715/760 |
| 2012/0324351 A1* | 12/2012 | Gao | G06F 16/9577 715/269 |
| 2013/0031470 A1* | 1/2013 | Daly, Jr. | G06F 16/9535 715/243 |
| 2013/0138503 A1* | 5/2013 | Brown | G06Q 30/0203 705/14.45 |
| 2013/0166394 A1* | 6/2013 | Churchill | G06Q 30/0276 705/14.72 |
| 2013/0311246 A1* | 11/2013 | Heber | G06Q 10/06395 705/7.41 |
| 2014/0165001 A1* | 6/2014 | Shapiro | G06F 16/54 715/811 |
| 2014/0244447 A1* | 8/2014 | Kim | G06Q 30/0643 705/27.2 |
| 2014/0280226 A1* | 9/2014 | Wilson | G06Q 30/0631 707/748 |
| 2014/0310591 A1* | 10/2014 | Nguyen | G06F 40/166 715/234 |
| 2014/0379428 A1* | 12/2014 | Phansalkar | H04L 67/22 705/7.32 |
| 2015/0106078 A1* | 4/2015 | Chang | G06F 16/35 704/9 |
| 2016/0077672 A1* | 3/2016 | Anderson | G06F 40/197 715/234 |
| 2016/0098172 A1* | 4/2016 | Bacinschi | G06F 8/38 715/747 |
| 2016/0224522 A1* | 8/2016 | Hague | G06F 3/04847 |
| 2016/0259840 A1* | 9/2016 | Zheng | G06Q 30/0277 |
| 2017/0031574 A1* | 2/2017 | Dhawal | G06F 40/14 |
| 2017/0046110 A1* | 2/2017 | He | G06F 3/14 |
| 2017/0103050 A9* | 4/2017 | Underwood | G06F 16/958 |
| 2020/0118145 A1* | 4/2020 | Jain | G06F 17/18 |
| 2020/0341779 A1* | 10/2020 | Rohde | G06F 8/20 |
| 2020/0341780 A1* | 10/2020 | Andolina | G06F 3/0481 |
| 2020/0341781 A1* | 10/2020 | Schoppe | G06Q 30/0271 |

* cited by examiner

GENERATING USER EXPERIENCE INTERFACES BY INTEGRATING ANALYTICS DATA TOGETHER WITH PRODUCT DATA AND AUDIENCE DATA IN A SINGLE DESIGN TOOL

BACKGROUND

Advancements in software and hardware platforms have led to a variety of improvements in systems that generate product-related user experience interfaces. For example, user experience systems are now able to provide a wide variety of design tools for creating and editing a wide array of user experience interfaces. Amid efforts to improve these user experience systems, some systems can, for example, generate templates or previews of a product storefront webpage before providing the website to a publisher for implementation.

Despite these advances however, conventional user experience systems continue to suffer from a number of disadvantages, particularly in their flexibility, accuracy, and efficiency. Indeed, conventional user experience systems often do not provide the desired control or flexibility when designing a product storefront. Even with some of the better conventional storefront designing tools available, these systems often restrict the design aspect of the storefront webpage to a particular silo (e.g., a software design tool), and require other aspects of the product storefront webpage to be "thrown over the wall" to a third party (e.g., a marketer or a developer) to build and/or implement the design manually. In this kind of typical partitioned workflow, the design is often rigidly applied in a uniform fashion for all audiences.

Additionally, many conventional user experience systems are inaccurate. For example, many conventional user experience systems provide design tools to create non-specific, generic design elements using non-specific, generic formats. By utilizing this generic, one-size-fits all approach, these systems fail to accommodate webpage/mobile designs for a wide variety of products, where different layouts and formats are better-suited for some products than others. As another result of generating generically-formatted user experiences in this fashion, these systems inaccurately account for audience preferences as well as more representative uses of space (or color or other design considerations) within a user interface during the design process. Indeed, conventional systems provide little, if any, insight into what actual implementation of a user experience interface will look like for a given product webpage during the design process.

Moreover, many conventional neural network systems are also inefficient. For example, many conventional systems require an excessive amount of action on the part of a designer in navigating between various interfaces and/or applications to design and publish a storefront webpage. To illustrate, some conventional systems requires users to access and utilize a design application to design a storefront webpage, and then to utilize an entirely separate application (often by exporting the design to an unrelated third party) to publish the website. Other conventional systems still further segregate the process, restricting the design process to one silo, the implementation or building of the design to a different silo (often involving an entirely separate user or team of users), and the publishing of the final website to a still different silo. By requiring such interconnectivity between applications and users, conventional systems not only require onerous interaction on the part of a user, but also inefficiently use computer resources (e.g., processing power and time).

Thus, there are several disadvantages with regard to conventional user experience systems.

SUMMARY

One or more embodiments described herein provide benefits and solve one or more of the foregoing or other problems in the art with systems, methods, and non-transitory computer readable media that generate user experience interfaces by utilizing product information, audience information, and user experience information together within a single design tool. Indeed, the disclosed systems integrate user experience information and product information directly into an interactive user experience design tool to create informed, personalized user experiences during the design process. By utilizing actual product information along with user experience information and/or audience information, the disclosed systems can implement more scalable designs, provide personalized storefront webpages to various audiences, and can further generate recommended modifications for various design elements. Additionally, the disclosed systems can publish directly from the user experience design tool to create a product storefront webpage accessible to end users, thereby removing the need for third-party (e.g., marketer or developer) interaction while also maintaining highly-detailed and personalized designs.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
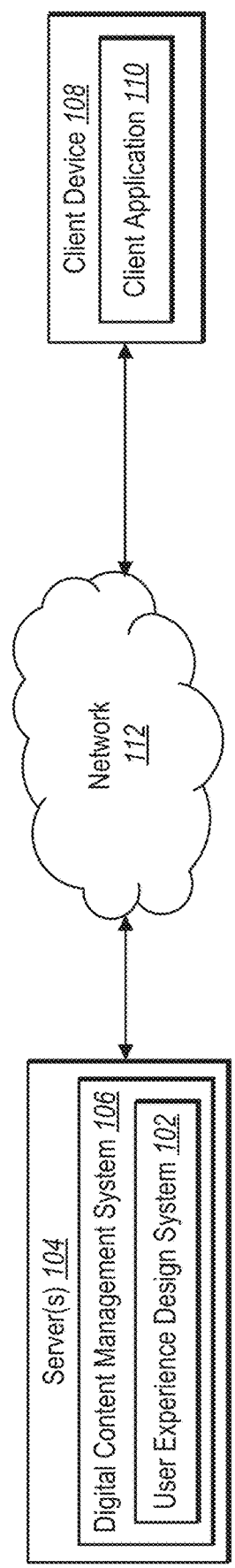
FIG. 1 illustrates an example environment for implementing a user experience design system in accordance with one or more embodiments.

One or more embodiments described include a user experience design system that generates product storefront webpage templates by integrating product information, user experience information, and audience information for use within a single design tool. Indeed, when creating an interactive storefront, it is very valuable to have actual data (e.g., product information, user reviews, etc.) to generate more attractive, accurate, and scalable user experience interfaces. Based on these data, the user experience design system can generate user experience interfaces with designs that match actual product information and that are effective for a given audience of users.

To illustrate, a user (e.g., a designer) may desire to create a product storefront webpage for a particular product targeted to a particular audience. Accordingly, the user experience design system can utilize multiple types of information to generate webpage design templates based on actual data related to the product, user behavior analytics, and/or an audience. For instance, the user experience design system can determine behavioral analytics, such as user experience information associated with various webpage design elements, by utilizing an analytics engine to analyze user behavior (e.g., click-throughs, views) associated with the webpage design elements. The user experience design system can also determine product information associated with various products by utilizing an internet-based product catalog engine that stores and maintains data pertaining to a variety of products. Additionally, the user experience design system can determine audience information associated with various audiences by utilizing an audience manager to analyze attributes (e.g., demographic information, shared interests) associated with the various audiences. Based on these various types of information, the user experience design system can further generate a webpage design template by modifying one or more webpage design elements in accordance with the product information, user experience information, and/or audience information.

As mentioned, the user experience design system can determine product information. For example, the user experience design system can receive product information from an internet-based product catalog engine. Indeed, in some embodiments the user experience design system can generate the product information by utilizing an internet-based product catalog engine to access various information related to a number of actual products for which a user (e.g., a designer) may desire to design a storefront webpage. For example, the user experience design system can access, for a given product, information pertaining to the product name, various colors, sizes, weights, reviews, descriptions, or other actual product information. As a result of utilizing actual product information, the user experience design system generates webpage design templates that accurately portray a representation of what a product storefront will look like upon completion.

As also mentioned, the user experience design system can generate behavioral analytics such as user experience information. In particular, the user experience design system can receive user experience information from an analytics engine. In some embodiments, the user experience design system can utilize the analytics engine to determine or generate the user experience information by analyzing user interactions with various design elements across multiple websites. For example, the user experience design system determines, for a given product (or a given design element), a number of user interactions (e.g., clicks, purchases, or views) that correspond to the product (or design element). As another example, the user experience design system generates predictions for an effectiveness (e.g., a probability of a conversion, a probability of a click, or a probability of a view) of utilizing a given design element (e.g., a title, a background color, etc.) based on probabilistic models and/or machine learning algorithms that analyze past performance of a variety of design elements to inform future predictions and/or to provide behavioral statistics.

In addition, the user experience design system can determine audience information. In particular, the user experience design system can receive audience information from an audience manager. In some embodiments, the user experience design system utilizes the audience manager to generate or determine audience information by analyzing attributes associated with one or more audiences. For example, the user experience design system, for a given audience, associates or ascribes attributes such as demographic information, common or shared interests, geographic information, or other information that users or members within the audience have in common. Indeed, the user experience design system can generate audiences based on audience information obtained from various users or viewers.

Based on the product information, the user experience information, and the audience information, the user experience design system can generate a webpage design template. In particular, the user experience design system can detect user input to create a product webpage. In response to the user input, the user experience design system can generate a modified webpage design element based on the product information, the user experience information, and/or the audience information. For example, the user experience design system determines a modification to make to an appearance of a webpage design element (e.g., a product name, a product description, a background color, etc.) to include the actual product information. Additionally, the user experience design system can modify a design element to include characteristics that are more effective based on analytics of the user experience information and/or that are more appealing to a particular audience in accordance with the audience information.

To illustrate an example, the user experience design system generates personalization rules associated with audiences based on the audience information. Indeed, the user experience design system can generate a personalization rule for a particular audience based on the audience information (e.g., audience attributes) associated with the audience. For example, the user experience design system determines that, for a particular audience (e.g., females age 30-35 who like drawing), a certain background color is more effective and/or more appealing. Thus, the user experience design system generates a personalized webpage design template for that particular audience using the determined background color. Similarly, for other audiences, the user experience design system generates personalized webpage design templates including design elements tailored to the audience. Thus, the user experience design system can provide, for display to a developer user or designer user, the various implementations of webpage design as they will appear to different audiences upon publishing.

In some embodiments, the user experience design system can generate recommendations for modifications to make to one or more webpage design elements. More specifically, the user experience design system can generate recommendations to provide to a designer user during the design process. For example, the user experience design system utilizes user experience information together with audience information and/or product information to generate a recommended modification to make to a particular design element that would make the design element more appealing to a certain audience. The user experience design system can further receive or detect user input to implement the recommended modification.

Furthermore, the user experience design system can publish a webpage design as a product storefront webpage. For instance, the user experience design system can generate a storefront webpage based on a generated webpage design template. In addition, the user experience design system can publish the design template as a storefront webpage for presentation to end users without involving a marketer or developer in the publishing process.

The user experience design system provides several advantages over conventional systems. For example, the user experience design system can improve flexibility over conventional systems. Indeed, by generating and publishing product storefront websites based on actual product information, audience information, and user experience information, the user experience design system provides a greater degree of control and flexibility for a designer to design and implement webpage designs without involving marketers and/or developers. As a result, the user experience design system eliminates the need for a designer to relinquish control of certain development or deployment aspects to third parties which may make undesired changes to the initial design. Additionally, the user experience design system flexibly adapts to different audiences based on personalization rules to provide appealing experiences specifically tailored for each audience.

As another advantage, the user experience design system improves accuracy relative to conventional systems. More specifically, the user experience design system greatly improves the accuracy of generating more informed webpage design templates by utilizing actual product data in generating webpage design elements to include in the design templates. For example, the user experience design system includes actual product descriptions and product reviews to accurately indicate to a designer user exactly how much space within a webpage design template is required to accommodate design elements that include the description and reviews. Additionally, the user experience design system generates recommendations to modify design elements to more accurately target specific audiences and/or to achieve particular goals in accumulating conversions, click-throughs, etc.

Furthermore, the user experience design system improves efficiency in relation to conventional systems. In particular, the user experience design system reduces the number of applications and user interactions required to generate and publish storefront webpages. For instance, the user experience design system integrates the design, development, and publishing of a product storefront webpage into a single, unified application. As a result, the user experience design system greatly reduces the number of user interactions required for a user (e.g., a designer) to create and publish product storefront webpages. As another result, the user experience design system further reduces computer resource requirements by eliminating the need for processing excessive user interactions with multiple different applications on the same or different computing devices. Indeed, due to processing fewer user inputs and running fewer applications, the user experience design system requires less processing power and less processing time than conventional systems.

As illustrated by the foregoing discussion, the present disclosure utilizes a variety of terms to describe features and benefits of the user experience design system. Additional detail is hereafter provided regarding the meaning of these terms as used in this disclosure. In particular, the term "user experience interface" (or simply "user experience" or "user interface") refers to an interactive digital user interface. For example, a user experience interface can include a webpage interface or an application interface with which an end user can interact. A user experience interface can refer to a webpage related to a particular product such as, for example, a product storefront webpage. A user experience interface can include one or more webpage design elements.

As used herein, the term "webpage design element" (or simply "design element") refers to a visible element or feature presented for display within a user experience interface or storefront webpage. For example, a webpage design element can refer to a background, a title, a text box, a digital image, a selectable button or icon, a text description, a product review, or some other visual component of a user interface. A webpage design element can have one or more "design element characteristics" (or simply "element characteristics" or "characteristics") that refer to characteristics or traits associated with various design elements. Such design element characteristics can include a color, a size (e.g., dimensions), a number of characters, a number of lines, a font type, a font size, a position (e.g., a coordinate location), a rotation, or a style.

Relatedly, the term "product storefront webpage" (or simply "storefront webpage," "product webpage," or "storefront") refers to a published webpage interface related to a particular product or products. For example, a product storefront webpage can refer to a webpage that is for selling a particular product and that is published for accessibility to end users. As used herein, the term "product" refers to goods or services that can be sold, rented, and/or otherwise distributed via a product webpage. Example products include items such as shoes, airline tickets, clothing, kitchenware, toys, sporting goods, electronics, or other goods in addition to services such as carpet cleaning services, dental services, babysitting services, travel services, or others.

As opposed to a published product storefront webpage, the term "webpage design template" (or simply "design template") refers to a webpage interface that is in the design process and that is not yet published or not yet available for end users to access. In particular, a webpage design template can refer to a collection of design elements that the user experience design system generates based on one or more factors to create an interactive user experience. The user experience design system provides tools for a designer user to create and edit the design elements to organize and design them as part of a webpage design template.

To generate a webpage design template, the user experience design system determines (or receives or generates) various types of information such as product information. As used herein, the term "product information" refers to information or data pertaining particularly to products. In some embodiments, product information refers to information maintained by an internet-based product catalog engine. For example, product information for a given product can refer to metadata including a product identification (e.g., a stock keeping unit number or other product identification number), a product name, a product category, a product description, a purchase history, a delivery history, one or more product reviews, a product price, product size(s), product color(s), product style(s), or other information that relates to the product. Relatedly, the term "internet-based product catalog engine" (or simply "product catalog engine") refers to a digital model that collects, stores, manages, and maintains product information associated with one or more products. Further, the user experience design system can implement a product catalog engine to publish a webpage design template as a storefront webpage accessible to end users for purchasing, renting, or otherwise engaging with a given product.

In addition (or alternatively) to product information, the user experience design system can utilize user experience information to generate a webpage design template. As used herein, the term "user experience information" refers to behavioral analytics information that models, predicts, explains, or describes user interactions (e.g., clicks, click-through rates, purchases, conversions, views, or impressions) with various design elements associated with one or more webpages. In some embodiments, "user experience information" refers to metadata that includes user interactions such as clicks, click-through rates, purchases, conversions, views, or impressions. For example, the user experience design system can utilize an "analytics engine" to generate user experience information such as numbers of previous conversions associated with various design elements or predictions on numbers of future clicks for given design elements. Indeed, in some embodiments, an analytics engine can refer to a probabilistic model or machine learning algorithm (e.g., a neural network) that generates probabilities or predictions based on user experience information.

In addition (or alternatively) to product information and/or user experience information, the user experience design system can utilize audience information to generate a webpage design template. As used herein, the term "audience information" refers to information (e.g., metadata) that indicates shared or common audience attributes associated with users/members of a given audience. Indeed, an "audience" refers to a group of end users that view or otherwise interact with a published storefront webpage. End users of an audience share attributes between them and, as a result, the user experience design system can treat those end users as a group due to a presumption that end users with similar attributes will be similarly affected by various design elements within a storefront webpage. Example "audience attributes" (or "attributes") include demographic information (e.g., name, age, race, ethnicity, gender, sex, education, and occupation), geographic information (e.g., location), purchase histories, delivery histories, shared or common interests, and socio-economic information (e.g., household income).

Based on determining attributes of an audience, the user experience design system can generate personalization rules to customize different appearances of a storefront webpage for different audiences. The term "personalization rule" refers to a rule or setting that defines a customization to change a characteristic of one or more design elements. For example, a personalization rule can identify that a specific background color is to be used for a given audience so that, when members of the audience view the storefront webpage, they see a personalized version of the webpage with the specific background color. Indeed, the user experience design system can generate different personalization rules for different audiences so that a designer can see the different appearances that will be presented to the different audiences upon publishing.

Additional detail regarding the user experience design system will now be provided with reference to the figures. For example, FIG. 1 illustrates a schematic diagram of an example environment for implementing a user experience design system 102 in accordance with one or more embodiments. An overview of the user experience design system 102 is described in relation to FIG. 1. Thereafter, a more detailed description of the components and processes of the user experience design system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 11.

As mentioned, the environment includes a client device 108. The client device 108 can be one of a variety of computing devices, including a smartphone, tablet, smart television, desktop computer, laptop computer, virtual reality device, augmented reality device, or other computing device as described in relation to FIG. 11. Although FIG. 1 illustrates a single client device 108, in some embodiments the environment can include multiple different client devices, each associated with a different user. The client device 108 can refer to a designer device and can further communicate with the server(s) 104 via the network 112. For example, the client device 108 can receive user input and other activity information and provide the information pertaining to user activity (including selections of and modifications to design elements for a webpage design template) to the server(s) 104. Thus, the user experience design system 102 on the server(s) 104 can receive information for user input to use in generating and publishing webpage design templates.

As shown, the client device 108 includes a client application 110. In particular, the client application 110 may be a web application, a native application installed on the client device 108 (e.g., a mobile application, a desktop application, etc.), or a cloud-based application where part of the functionality is performed by the server(s) 104. The client application 110 can present or display information to a user (e.g., a designer), including a user interface for creating and editing user experience interfaces for product storefront webpages. A user can interact with the client application 110 to provide user input to, for example, modify or add a design element or to publish a finished webpage design template.

As illustrated in FIG. 1, the environment includes the server(s) 104. The server(s) 104 may generate, store, process, receive, and transmit electronic data, such as design elements, webpages design templates, and personalization rules. For example, the server(s) 104 may receive data from the client device 108 in the form of a request to modify a design element. In addition, the server(s) 104 can transmit data to the client device 108 to provide a modified design element based on the user input. The server(s) 104 can communicate with the client device 108 to transmit and/or receive data via the network 112. In some embodiments, the server(s) 104 comprises a content server. The server(s) 104 can also comprise an application server, a communication server, a web-hosting server, a social networking server, a digital content campaign server, or a digital content management server.

As shown in FIG. 1, the server(s) 104 can also include the user experience design system 102 as part of a digital content management system 106. The digital content management system 106 can communicate with the client device 108 to generate, modify, and transmit digital content, such as a webpage including one or more digital images or other webpage design elements. Additionally, the digital content management system 106 can transmit a published product storefront webpage to make the webpage accessible to end users.

Although FIG. 1 depicts the user experience design system 102 located on the server(s) 104, in some embodiments, the user experience design system 102 may be implemented by (e.g., located entirely or in part) on one or more other components of the environment. For example, the user experience design system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the user experience design system 102, bypassing the network 112. Additionally, the user experience design system 102 can include one or more databases (e.g., a product information database, a user experience information database, and an audience information database) housed on the server(s) 104 or elsewhere in the environment. In addition, the environment can include end user devices associated with end users of one or more audiences that interact with a published storefront webpage. The user experience design system 102 can be implemented in a variety of different ways across the server(s) 104, the network 112, and the client device 108. Additional detail regarding implementing different components of the user experience design system 102 across devices is provided below.

Figure 2:
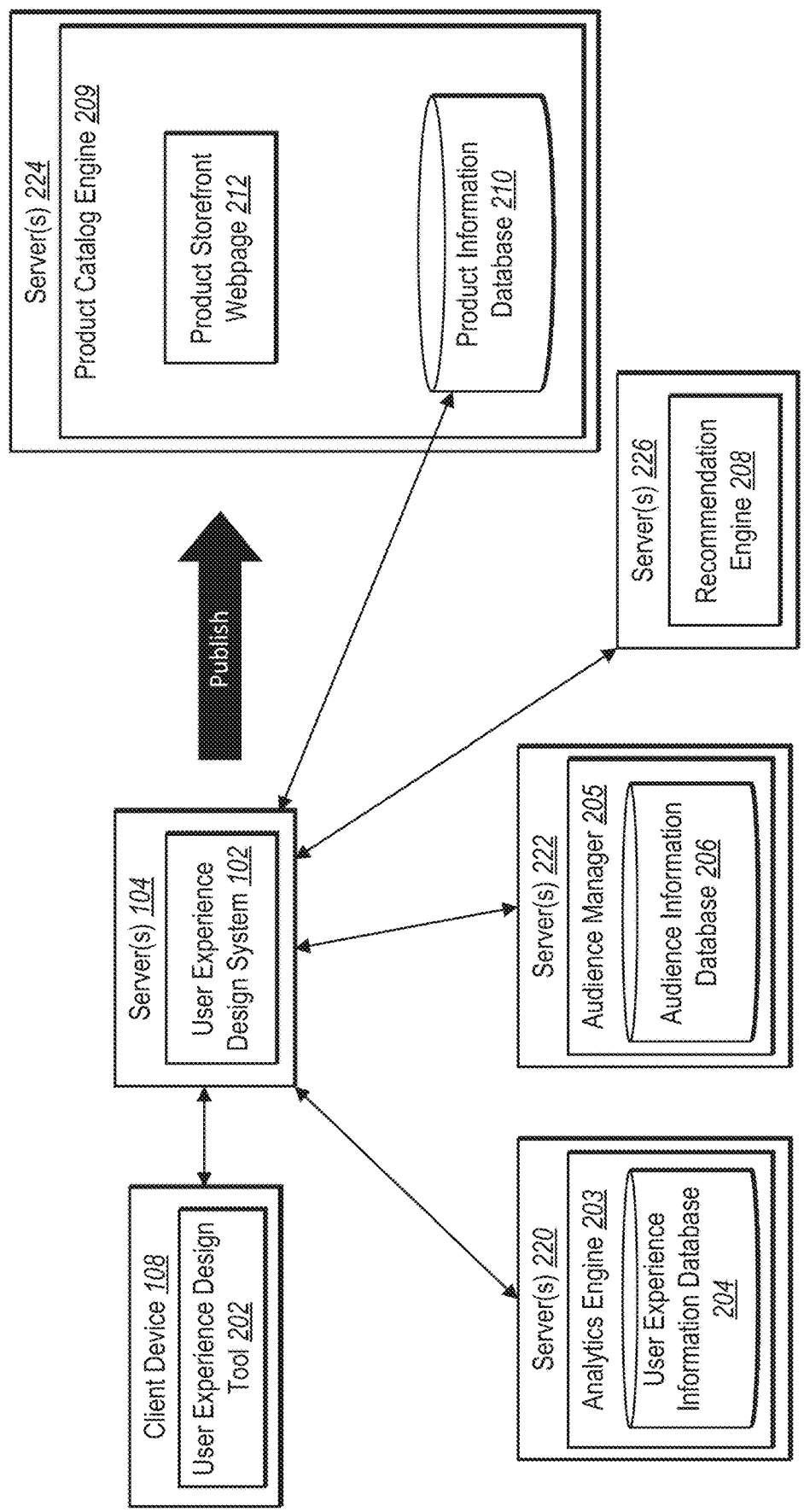
FIG. 2 illustrates an example architecture of components of the user experience design system in accordance with one or more embodiments.

As mentioned above, the user experience design system 102 utilizes a product catalog engine, an analytics engine, and/or an audience manager to generate a webpage design template. FIG. 2 illustrates an example architecture of the user experience design system 102 including a product catalog engine 209, an analytics engine 203, and an audience manager 205, in addition to a recommendation engine 208 and a user experience design tool 202.

As illustrated in FIG. 2, the user experience design system 102 enables a single user experience design tool 202 to access information distributed across multiple servers/systems/databases. To elaborate, a user can use a client device 108 to access the user experience design tool 202. More specifically, the user experience design system 102 utilizes a product catalog engine 209 to access product information stored within a product information database 210. In addition, the user experience design system 102 utilizes an analytics engine to access user experience information stored within a user experience information database 204. Further, the user experience design system 102 utilizes an audience manager 205 to access audience information stored within an audience information database 206. Each of the databases 204, 206, and 210 can be located locally on a single server (e.g., server(s) 104) or distributed in cloud-based fashion across multiple devices. The implementation illustrated by FIG. 2 comprises a distributed architecture.

Specifically, the user experience design tool 202 can communicate with the user experience design system 102 hosted by the server(s) 104. The user experience design system 102 hosted by the server(s) 104 can in turn send requests to, and receive data from, the analytics system 203 hosted by the server(s) 220, the audience manager 205 hosted by server(s) 222, the recommendation engine 208 hosted by server(s) 226, and the product catalog engine 209 hosted by server(s) 224. As shown by FIG. 2, in one or more embodiments, the user experience design system 102 has a distributed architecture whereby different systems/managers are hosted by different servers.

The distributed architecture of the user experience design system 102 can solve the problem of massive record flow and huge databases that can create a bottleneck in large networks. In particular, the user experience design system 102 uses the distributed architecture to solve bottlenecking by having different distributed system collect and process information which is then accessible from a central location (e.g., the user experience design system 102).

To access the information associated with each of the databases 204, 206, and 210, the user experience design system 102 makes one or more application programming interface ("API") calls. The user experience design system 102 makes API calls to the analytics engine 203 to access information from the user experience information database 204. Similarly, the user experience design system 102 makes an API call to the audience manager 205 to access information from the audience information database 206. In like fashion, the user experience design system 102 makes an API call to the product catalog engine 209 to access information from the product information database 210. The user experience design system 102 loads the three data APIs (and, in some embodiments, an API for the recommendation engine 208) upon detecting startup or launch of the user experience design tool 202 (e.g., upon app launch). In some embodiments, however, the user experience design system 102 lazy-loads the APIs to defer the initialization or loading of each API until it is called.

In order to make an API call, the user experience design system 102 authenticates a user to enable the user to utilize the user experience design tool 202 to access or interact with the analytics engine 203, the audience manager 205, the recommendation engine 208, and the product catalog 209. More specifically, the user experience design system 102 receives (via user interaction with the user experience design tool 202 by way of a keyboard, touchscreen, or other input device) a username and password to authenticate a user. Based on the username and password (or other authentication credentials), the user experience design system 102 generates an authentication token (or simply "token") for the user. The user experience design system 102 stores and utilizes the authentication token for subsequent API calls to increase speed and efficiency of utilizing the user experience design tool 202—i.e., by eliminating the need to require authentication credentials each time the user experience design system 102 makes an API call to a component (e.g., one or more of the analytics engine 203, the audience manager 205, the recommendation engine 208, and the product catalog engine 209) located on a different server.

Based on the received information as a result of an API call, the user experience design system 102 displays (or provides for display), via a user interface of the user experience design tool 202, the user experience information that relates to a particular product. Indeed, the user experience design system 102 enables a user to cycle through different products, whereupon the user experience design system 102 automatically makes API calls to access user experience information pertaining to each particular product to then display the respective user experience information to the designer user.

The analytics engine 203 can be implemented by one or more server(s) 220. The analytics engine 203 can collect, aggregate, and report touchpoint data, event data and other analytics data. As used herein, the term "touchpoint" refers to an interaction between two entities that can be tracked and stored. In particular, a touchpoint refers to an exposure of a user to digital content associated with a digital content provider (e.g., a business or company). For example, a touchpoint can refer to receiving an email, viewing an advertisement for the entity, visiting a webpage or social network page managed by the entity, or viewing a link to a webpage or social network page of the entity whether as a result of an organic search, a paid search, or a link provided by a third party (i.e., a referring domain). Touchpoints usually occur via distribution channels.

Further, as used herein, the term "touchpoint data" refers to digital data representing touchpoints. In particular, when a user is exposed to digital content associated with a digital content provider, the analytics engine 203 can store, into a database accessible or available to that digital content provider, touchpoint data corresponding to the particular touchpoint. For example, an instance of touchpoint data can include an indication of a touchpoint and a timestamp associated with the touchpoint.

Additionally, as used herein, the term "event" refers to a quantifiable action performed by a user or a quantifiable result of an action by a user. In some cases, an event includes a discrete quantifiable action (or result of an action) taken by a visitor on a network platform, such as in a software application or a on website. For example, an event can include, but is not limited to, an application download, an application use, a click, a click-through, a conversion, an order, a purchase, a webpage view, a web search, an instance of a quantity of time spent on a given webpage, a first time visit, a visitor from a search engine or a social networking site, a transaction resulting in a quantity of revenue, or a quantity of revenue over a certain amount.

The analytics engine 203 can collect touchpoint data associated with a particular user. The analytics engine 203 can collect the touchpoint data in a variety of ways. For example, in one or more embodiments, the analytics engine 203 causes one or more server(s) 220 which implement the analytics engine 203 and/or the third-party network server(s) to track users' touchpoint data and report the tracked touchpoint data for storage in the user experience information database 204. To illustrate, the third-party network server(s) can include an email server that distributes emails from a digital content provider, tracks the emails to determine that they were properly received, and reports touchpoint data corresponding to each recipient that properly received the email to the analytics engine 203. In one or more embodiments, the analytics engine 203 receives user data directly from the client devices 108 (e.g., browser cookies, cached memory), embedded computer code (e.g., tracking pixels), a user profile, or using various types of tracking techniques. Thus, the analytics engine 203 collects or otherwise receives various types of data, including data regarding interactions of the users web sites, emails, native mobile device software applications, etc.

Based on generating and providing an API call to the analytics engine 203, the user experience design system 102 causes the analytics engine 203 to provide user experience information from the user experience information database 204. The user experience design system 102, in turn, receives the user experience information provided by the analytics engine 203. For example, the user experience design system 102 makes a specific API call (including an authentication token) to access a particular type of user experience information such as impressions. In response, the analytics engine 203 provides (and the user experience design system 102 receives) the impressions in the form of metadata. Similarly, in some embodiments the user experience design system 102 makes an API call to access different types of user experience information such as clicks or views, whereupon the analytics engine 203 provides the corresponding information.

As mentioned, the user experience design system 102 utilizes user experience information stored within the user experience information database 204 to generate webpage design templates. In particular, the user experience design system 102 implements the analytics engine 203 to generate or determine various information pertaining to user actions in relation to various products and/or design elements. For example, the user experience design system 102 utilizes the analytics engine 203 to generate user experience information in the form of a number of impressions, clicks, and/or total revenue associated with a particular product. In some embodiments, the user experience design system 102 generates a heatmap to illustrate numbers (or frequency) of user actions, where the designer user can hover a cursor over portions of the heatmap to view the corresponding statistics.

As another example, the user experience design system 102 uses the analytics engine 203 to determine a number of clicks associated with digital images having particular characteristics. As yet another example, the user experience design system 102 uses the analytics engine 203 to determine a number of conversions based on webpages that utilize a particular layout of design elements. The user experience design system 102 further uses the analytics engine 203 to store the user experience information within (and access the user experience information from) the user experience information database 204.

To generate user experience information, in some embodiments the user experience design system 102 utilizes the analytics engine 203 to generate a particular metadata structure that indicates a product identification along with one or more user interactions and/or numbers of each of the one or more user interactions. For instance, the user experience design system 102 generates a metadata structure that identifies a particular product along with a number of purchases of the product, a number of clicks associated with the product, and/or a number of views of the product. In some embodiments, the user experience design system 102 also (or alternatively) generates a metadata structure that indicates a design element such as a particular user-selectable icon and further indicates user interactions associated with the icon. Accordingly, the user experience design system 102 generates user experience information associated with products and/or design elements based on past user behavior.

In some embodiments, the user experience design system 102 further implements the analytics engine 203 to generate predictions of future end user actions. To illustrate, the user experience design system 102 utilizes the analytics engine 203 in the form of a neural network to, for example, predict a number of clicks, purchases, or views a particular product (or design element) will achieve. Indeed, in these embodiments, the user experience design system 102 trains a neural network (e.g., as part of the analytics engine 203) based on training data (e.g., a training product or training element) and ground truth results (e.g., actual numbers of user interactions associated with the training data). Upon training the neural network to generate accurate predictions, the user experience design system 102 implements the neural network to determine design elements and/or products that are more beneficial to use for a given purpose (e.g., to achieve the most clicks, purchases, or other user interactions). Thus, the user experience design system 102 utilizes the analytics engine 203 to generate future behavioral predictions in addition (or alternatively) to historical analytics information.

To receive/retrieve information from the analytics engine 203, the user experience design system 102 generates and sends and API call requesting specific metadata/analytics data. The user experience design system 102, in turn, receives the user experience information provided by the analytics engine 203. For example, the user experience design system 102 makes a specific API call to access a particular type of user experience information such as impressions. In response, the analytics engine 203 provides (and the user experience design system 102 receives) the impressions. Similarly, in some embodiments the user experience design system 102 makes an API call to access different types of user experience information such as clicks or total revenue for a product, whereupon the analytics engine 203 provides the corresponding information.

As further illustrated in FIG. 2, the user experience design system 102 utilizes audience data to generate webpage design templates. The audience manager 205 can gather data similar to the analytics engine 203 to identify and manage identities and associated user accounts and devices. For example, the audience manager 205 can determine how client devices relate to each other either at the user or household level to focus or expand identifies and targeting parameters. The audience manager 205 can group identifies and profiles into segments.

The user experience design system 102 utilizes the audience manager 205 to determine and/or access information within the audience information database 206. To illustrate, the user experience design system 102 utilizes the audience manager 205 to determine or receive audience information in the form of demographic information, shared interests, or other information as described above. Indeed, the user experience design system 102 utilizes the audience manager 205 to generate a metadata structure that includes an audience identification in addition to, for instance, an audience age range, a gender, a listing of shared interests, or other audience attributes associated with the audience corresponding to the audience identification.

To obtain the necessary audience information, as mentioned above, the user experience design system 102 generates and provides an API call to the audience manager 205. Based on providing the API call to the audience manager 205, the user experience design system 102 causes the audience manager 205 to provide user audience information from the audience information database 206. The user experience design system 102, in turn, receives the audience information provided by the audience manager 205. For example, the user experience design system 102 makes an information-type-specific API call (including an authentication token) to access a particular type of audience information such as an audience age range. In response, the audience manager 205 provides (and the user experience design system 102 receives) the audience age range in the form of metadata. Similarly, in some embodiments the user experience design system 102 makes an API call to access different types of audience information such as gender or shared interests, whereupon the audience manager 205 provides the corresponding information.

Based on the audience information, the user experience design system 102 generates personalization rules to customize the appearance of a webpage design template (and, in turn, a product storefront webpage). In particular, the user experience design system 102 automatically maps (or enables a designer user to map) the audience information to respective webpage design elements of a webpage design template. In some embodiments, the user experience design system 102 generates personalization rules on an audience-by-audience basis. For instance, the user experience design system 102 generates, for each audience within a plurality of audiences, a personalization rule that dictates or defines customization of a webpage design template (and ultimately a product storefront webpage 212).

Indeed, the user experience design system 102 determines design elements and/or element characteristics that are more appealing or effective for a particular audience. For example, the user experience design system 102 generates personalization rules based on audience information that, for a given audience, indicates interests of end users that belong to the audience. In some cases, for example, the user experience design system 102 generates text (e.g., product names, reviews, titles, etc.) with a larger font size for audiences whose age range is above a threshold age (e.g., 65) to indicate a higher degree of difficulty seeing smaller fonts. Thus, the user experience design system 102 generates a webpage design template that includes digital text, digital images, background colors, or other elements with element characteristics that the audience finds more appealing and/or effective.

In some embodiments, the user experience design system 102 generates personalization rules based on information other than only audience information. In particular, in these embodiments the user experience design system 102 utilizes audience information in conjunction with user experience information to determine design elements that particular audiences typically interact with more than others. For example, the user experience design system 102 determines, for a particular audience, that end users of the audience frequently click on images of blue shoes. As a result, the user experience design system 102 generates a personalization rule that indicates to, for the given audience, present a webpage design template (and product storefront webpage) with an image of a blue shoe. The user experience design system 102 generates a personalization rule in the form of a metadata structure that includes a personalization rule identification, an audience identification, and one or more indications of design elements and corresponding design element characteristics.

By customizing the webpage design template based on personalization rules, the user experience design system 102 generates templates tailored to specific audiences, where the user experience design system 102 may generate a number of templates with different appearances for as many potential audiences may ultimately access the webpage (e.g., the product storefront webpage 212) after publishing. Indeed, in some embodiments, the user experience design system 102 generates personalization rules to customize generates webpage design templates for a designer user to see the different appearances that will be presented to the different audiences. In the same or other embodiments, the user experience design system 102 generates the customized appearances for presentation to the different audiences at runtime for end users upon accessing a published product storefront webpage 212. In these embodiments, the user experience design system 102 utilizes the product catalog engine 209 to publish the webpage design template, determine an audience for an end user accessing the published product storefront webpage 212, and present the product storefront webpage 212 in accordance with the appropriate personalization rule.

As mentioned, the user experience design system 102 also utilizes product information to generate webpage design templates. In particular, the user experience design system 102 utilizes product information stored within the product information database 210. More specifically, the user experience design system 102 implements an internet-based product catalog engine 209 to determine product information associated with one or more products whose information is stored within the product information database 210.

To elaborate, the user experience design system 102 utilizes the product catalog engine 209 to access actual product information for designing storefront webpages (e.g., the product storefront webpage 212). For instance, the user experience design system 102 accesses, from the product information database 210, information for a given product including a product identification, a product name, a description, a price, a review, and/or other product information as described above. Thus, the user experience design system 102 generates design elements utilizing the actual product information so that, as the designer continues to design the webpage design template, the user experience design system 102 provides more accurate representations of what the published version of the webpage will look like using the actual information.

To obtain the various product information, as mentioned above, the user experience design system 102 generates and provides an API call to the product catalog engine 209. Based on providing the API call to the product catalog engine 209, the user experience design system 102 causes the product catalog engine 209 to provide product information from the product information database 210. The user experience design system 102, in turn, receives the product information provided by the product catalog engine 209. For example, the user experience design system 102 makes a type-specific API call (including an authentication token) to access a particular type of product information such as a product name. In response, the product catalog engine 209 provides (and the user experience design system 102 receives) the product name in the form of metadata. Similarly, in some embodiments the user experience design system 102 makes an API call to access different types of product information such as a price, a description, or a review, whereupon the product catalog engine 209 provides the corresponding information.

Based on the received information as a result of an API call, the user experience design system 102 replaces, via the user experience design tool 202, a placeholder within a webpage design template. Particularly, the user experience design system 102 generates type-specific placeholders within a webpage design template to indicate locations for audience information, product information, digital images, and/or user experience information. Upon receiving the product information, for example, the user experience design system 102 replaces a product information placeholder with the actual product information obtained via the API call. By filling placeholders based on real information in this manner, the user experience design system 102 enables a user to cycle through different audiences and/or products to see how the webpage design template looks based on the real information associated with each audience/product.

As illustrated in FIG. 2, the user experience design system 102 further utilizes a recommendation engine 208 to generate recommendations. In particular, the user experience design system 102 utilizes the recommendation engine 208 to generate recommended design elements to implement within a webpage design template. Additionally (or alternatively), the user experience design system 102 generates recommended element characteristics and/or recommended modifications to element characteristics. Indeed, in some embodiments the user experience design system 102 generates a recommendation in the form of a metadata structure that includes a recommendation identification, a design element identification indicating the element to be modified, and element characteristics associated with the design element that indicate the changes to recommend making to the design element. For example, to generate a recommendation to modify a text box, the user experience design system 102 generates a recommendation indicating the text box, a background color, and a font weight.

In some embodiments, to use the recommendation engine 208 to generate recommendations, the user experience design system 102 makes an API call. In particular, the user experience design system 102 generates and provides an API call together with one or more types of information such as user experience information, audience information, and/or product information. For example, the user experience design system 102 provides, along with this information, a recommendation-type-specific API call (including an authentication token and a webpage design element identifier) to the recommendation engine 208 to generate a particular recommendation to modify, for example, a background color (or another webpage design element corresponding to the identifier provided via the API call). In response, the recommendation engine 208 provides (and the user experience design system 102 receives) a recommendation for a particular background color in the form of metadata. In some embodiments, however, the user experience design system 102 makes an API call for a general recommendation, whereupon the recommendation engine 208 provides a recommendation that includes modifications to one or more different aspects of a webpage design template.

To generate the recommendations by applying the recommendation engine 208, the user experience design system 102 utilizes one or more types of information associated with the analytics engine 203, the audience manager 205, and/or the product catalog engine 209. For example, the user experience design system 102 generates recommendations based on user experience information that indicates design elements and/or element characteristics that receive the most clicks. As another example, the user experience design system 102 generates recommendations based on audience information that indicates audience attributes that indicate preferences for particular design elements and/or characteristics. As yet another example, the user experience design system 102 generates recommendations based on personalization rules, where, instead of automatically generating a design element in accordance with a personalization rule (as is sometimes the case), the user experience design system 102 generates a recommendation in accordance with the personalization rule and leaves the ultimate implementation of the modification up to the designer user. The user experience design system 102 surfaces or displays the recommended modifications based on a focus of the designer user—e.g., based on detecting a hover or click on a particular webpage design element that has a corresponding recommendation.

As mentioned, the user experience design system 102 publishes a webpage design template as a product storefront webpage 212. In particular, the user experience design system 102 utilizes the product catalog engine 209 to publish the product storefront webpage 212 including design elements in accordance with recommendations and personalization rules, as described herein. By utilizing the product catalog engine 209 to publish the product storefront webpage 212, the user experience design system 102 make the product storefront webpage 212 available to end users. Additional detail regarding publishing a webpage design template as a product storefront webpage is provided below with reference to FIG. 6.

As further illustrated in FIG. 2, the user experience design system 102 integrates the above-described functionality to generate, edit, and publish a webpage design template into a single user experience design tool 202. More specifically, the user experience design system 102 receives, via the user experience design tool 202, user input from a designer user to create and/or edit a webpage design template including various design elements. In addition, and as described, the user experience design system 102 accesses or generates the requisite information to create and/or modify the design elements using the analytics engine 203, the audience manager 205, the product catalog engine 209, and the recommendation engine 208. Accordingly, by condensing all of the above-described functionality for implementation via a single user experience design tool 202, the user experience design system 102 greatly reduces the number of applications, user interfaces, and user interactions required for the designer user to create, edit, and publish a webpage design template.

Figure 3:
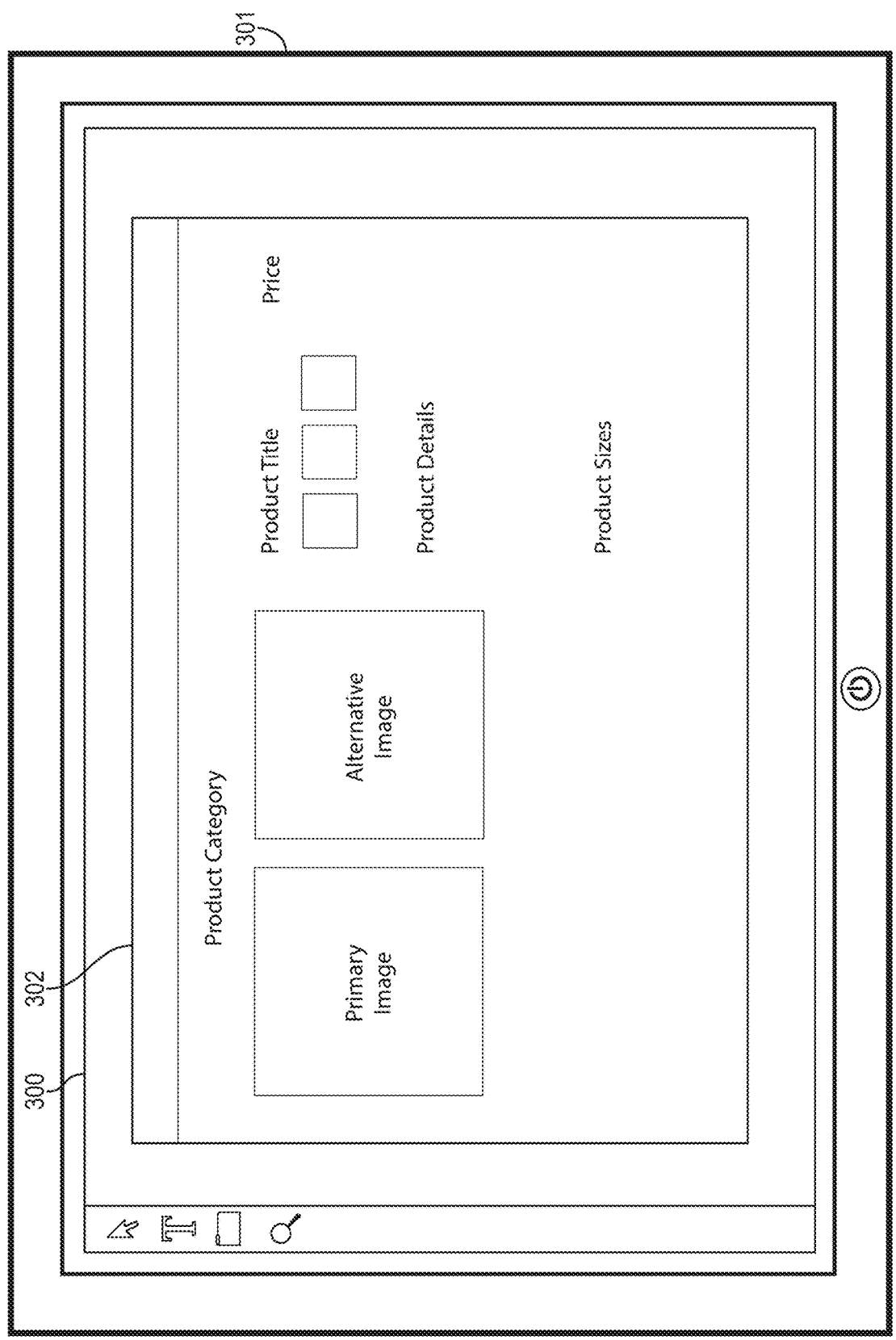
FIG. 3 illustrates an example webpage template generated by a prior art system in accordance with one or more embodiments.

As mentioned above, conventional systems suffer from a number of disadvantages in generating templates for webpages. Indeed, FIG. 3 illustrates an example webpage template 302 within a user interface 300 of a conventional system. As shown, the client device 301 is running a conventional system which generates the webpage template 302 including a generic layout of generic design elements. Indeed, the webpage template 302 includes indications of locations to place digital images (e.g., the primary image and the alternative image) along with a placeholder for a product category, a product title, a price, product details, and product sizes. However, the webpage template 302 includes no actual information and provides no customization options or recommendations.

To resolve these issues, along with other disadvantages of conventional systems described above, the user experience design system 102 generates a webpage design template based on actual product information, audience information, and user experience information to provide a more realistic, more accurate representation of design elements within a webpage design template. Indeed, FIG. 4 illustrates the client device 108 presenting a user interface 400 associated with the user experience design system 102 (e.g., a user interface of the user experience design tool 202 running as part of the client application 110) including a webpage design template 402.

Figure 4:
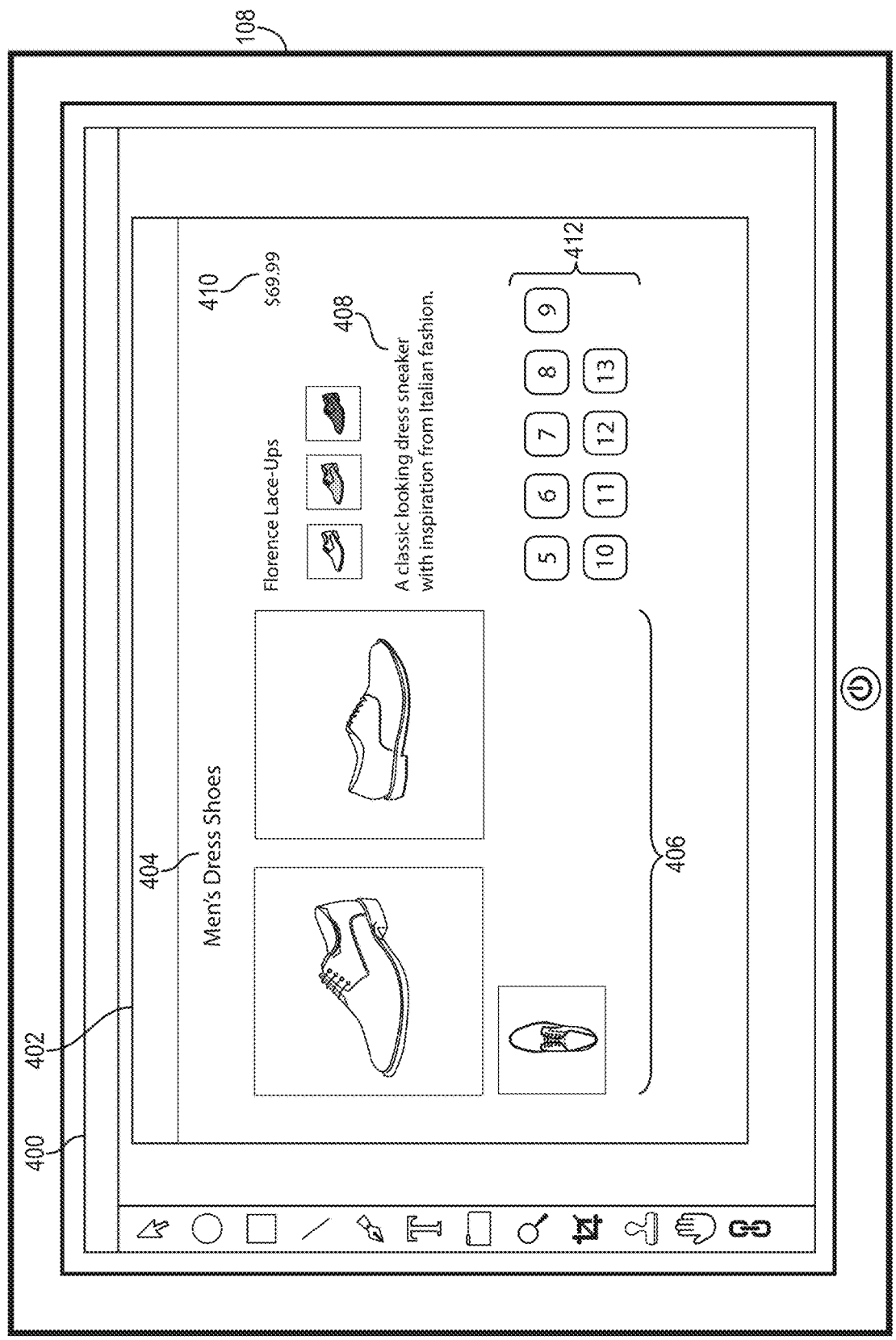
FIG. 4 illustrates an example webpage design template of the user experience design system in accordance with one or more embodiments.

As shown in FIG. 4, the user experience design system 102 generates the webpage design template 402 for a particular product—a shoe called "Florence Lace-ups." In particular, the user experience design system 102 generates the webpage design template 402 to include various design elements related to the specific product. For example, the user experience design system 102 generates the webpage design template 402 to include a product category 404, a number of digital images 406, a product description 408, a price 410, a number of sizes 412, and other product information.

Unlike conventional systems that provide generic placeholders for design elements in a generic layout, the user experience design system 102 generates the webpage design template 402 to include actual product information such as the actual product category 404, price 410, and product description 408. Thus, the user experience design system 102 accommodates space required for actual product descriptions and other information to thereby provide a more realistic layout of how the webpage design template 402 will look to end users upon publishing, in contrast to conventional systems whose design may break when product information such as a product description is added to a space that may not be properly sized for the length of the description.

To illustrate from FIG. 4, the user experience design system 102 provides the product category 404 of "Men's Dress Shoes." More particularly, the user experience design system 102 determines the product category by utilizing the product catalog engine 209 determine the product category 404 associated with the relevant product. In addition, the user experience design system 102 utilizes the product catalog engine 209 to determine other product information available for use within the webpage design template 402. Indeed, based on the product information, the user experience design system 102 generates the additional design elements such as the digital images 406, the price 410, the product description 408, and the sizes 412 based on actual product information pertaining to the specific product of the webpage design template 402.

Figure 5:
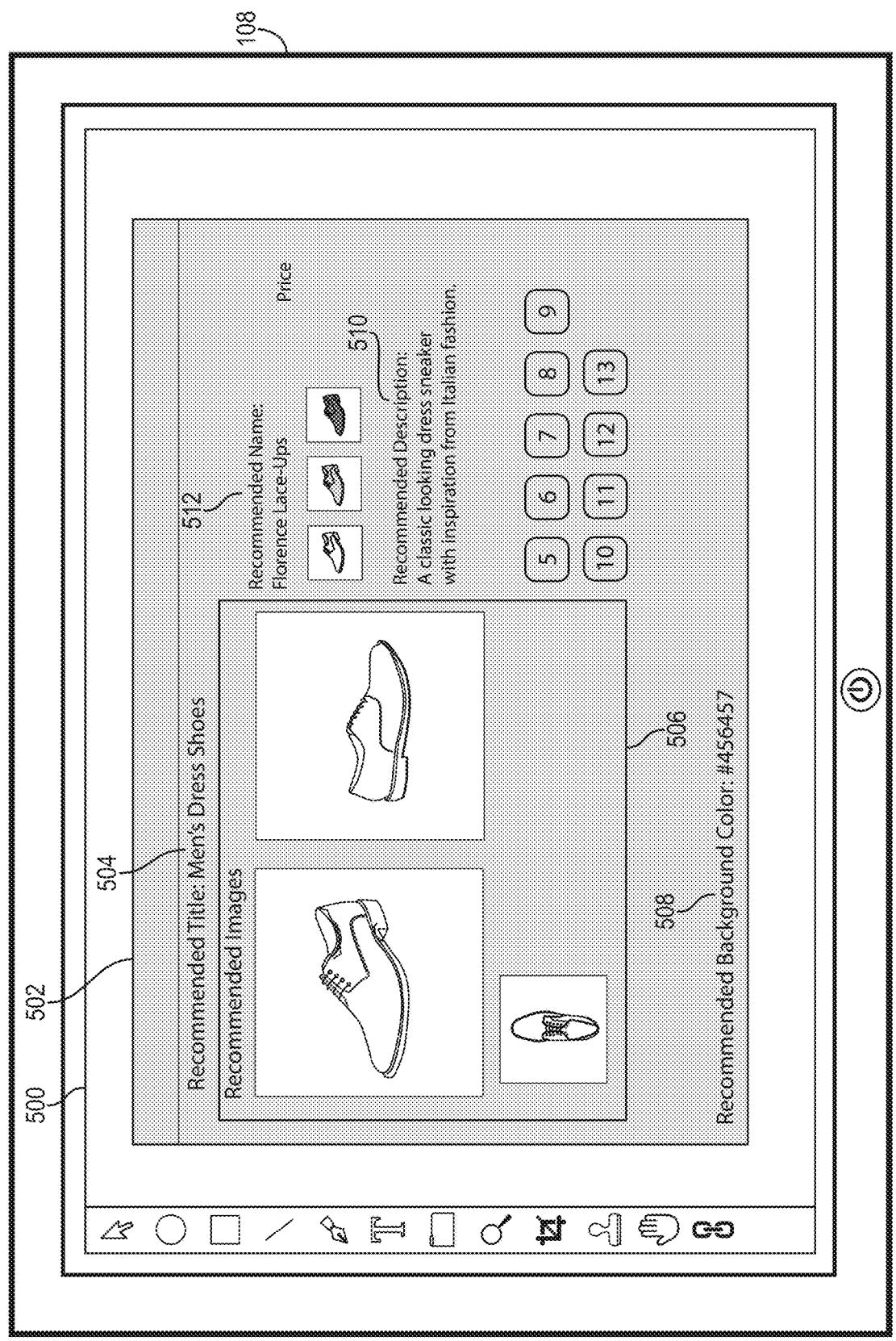
FIG. 5 illustrates an example webpage design template including generated recommendations in accordance with one or more embodiments.

As mentioned above, the user experience design system 102 further generates recommendations for creating a webpage design template. FIG. 5 illustrates a webpage design template 502 including example recommendations. Indeed, as shown in FIG. 5, the client device 108 displays a user interface 500 associated with the user experience design system 102 (e.g., a user interface of the user experience design tool 202) for creating or editing the webpage design template 502. Within the webpage design template 502, the user experience design system 102 generates recommendations to create and/or modify various design elements.

For example, the user experience design system 102 generates a recommended title 504 for the webpage design template 502. In some embodiments, the user experience design system 102 generates the recommended title 504 based on various information such as product information from the product catalog engine 209. Indeed, the user experience design system 102 utilizes the product catalog engine 209 to determine a product category associated with the product to use as the recommended title 504.

The user experience design system 102 generates other recommendations as well. As shown in FIG. 5, the user experience design system 102 generates recommended images 506, a recommended background color 508, a recommended product name 512, and a recommended product description 510. To generate one or more of the recommendations for the webpage design template 502, the user experience design system 102 utilizes audience information and/or user experience information. To illustrate, the user experience design system 102 generates the recommended background color 508 based on utilizing the analytics engine 203 to determine that the recommended images 506 receive the most clicks (or other user interactions) from a pool of candidate digital images for the product. Additionally, the user experience design system 102 generates a particular number of the recommended images 506 having a particular layout and with particular image dimensions based on user experience information that indicates a most effective number, layout, and size of digital images. As another example, the user experience design system 102 utilizes the audience manager 205 to determine that a particular target audience prefers the recommended background color 508.

Although FIG. 5 illustrates recommendations automatically applied within the webpage design template 502, additional or alternative embodiments are possible. For example, in some embodiments the user experience design system 102 provides an option for a designer user to accept the recommendations before applying them to the webpage design template 502. In these or other embodiments, the user experience design system 102 generates and displays the recommendations along with a user-selectable option to accept or decline the recommendations. Additionally (or alternatively), in some embodiments the user experience design system 102 provides a user-selectable option to generate recommendations on an individual design-element basis and/or on a webpage-design-template basis to generate recommendations for all (or more than one) of the design elements of the webpage design template 502 as a whole.

As mentioned above, the user experience design system 102 can utilize a product catalog engine 209 to publish a webpage design template as a product storefront webpage 212. Indeed, FIG. 6 illustrates an example process for publishing a webpage design template as a product storefront webpage, including a process 602 implemented at publish time and a process 604 implemented at storefront webpage load time (i.e., a time when the storefront webpage is accessed by an end user).

Figure 6:
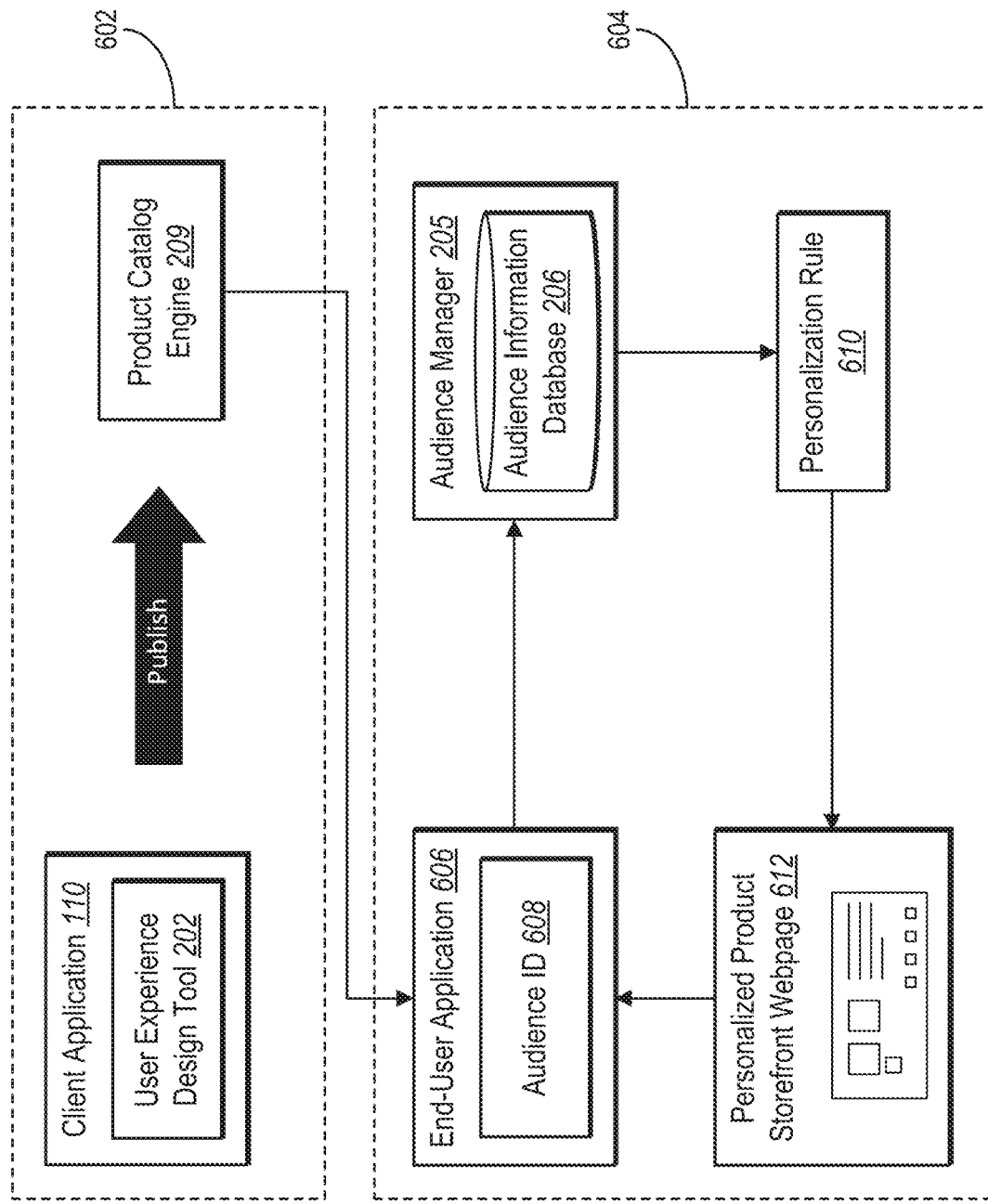
FIG. 6 illustrates an example process of publishing a webpage design template as a product storefront webpage in accordance with one or more embodiments.

As illustrated in FIG. 6, the user experience design system 102 performs a process 602 to publish a webpage design template as a product storefront webpage. In particular, the user experience design system 102 receives input via the user experience design tool 202 on the client application 110 to publish a webpage design template (402 or 502) as a product storefront webpage (e.g., the product storefront webpage 212). In response to the user input to publish the webpage design template, the user experience design system 102 transmits the webpage design template, along with audience-based personalization rules and other necessary information, to the product catalog engine 209. For example, the user experience design system 102 makes an API call including the webpage design template (e.g., in JSON or XML format), other assets (e.g., digital images and fonts), and the personalization rules to the product catalog engine 209. Upon transmitting the template along with the personalization rules, the user experience design system 102 utilizes the product catalog engine 209 to publish the webpage design template as a product storefront webpage 212 accessible to end users. In some embodiments, the user experience design system 102 utilizes the product catalog engine 209 to decompose (e.g., via a parsing technique) the webpage design template, the assets, and the personalization rules into their own respective databases.

As further illustrated in FIG. 6, the user experience design system 102 performs a process 604 to provide the product storefront webpage 212 to end users. For instance, the user experience design system 102 performs the process 604 to, in response to detecting access to the product storefront webpage 212 from an end user via the end-user application 606, provide the product storefront webpage 212 based on a personalization rule for an audience associated with the end user. Indeed, as mentioned above, the user experience design system 102 utilizes personalization rules to not only provide a designer user with personalized webpage design templates to tailor for various audiences but also to provide end users with personalized product storefront webpages after publishing.

To elaborate on providing personalized product storefront webpages to end users, the user experience design system 102 determines an audience identification 608 associated with an end user using an end-user application 606 to access a published product storefront webpage 212. To determine the audience identification 608, the user experience design system 102 identifies an audience identification 608 associated with the end user as part of a user profile. In some embodiments, the user experience design system 102 determines audience information associated with the end user corresponding to the end-user application 606.

For example, in embodiments where the user experience design system 102 does not have a predetermined audience identification 608 for the end user, the user experience design system 102 utilizes profile information associated with the end user in addition to location information associated with the end-user application 606 (or end-user device) to determine a particular audience to which the end user belongs. For example, the user experience design system 102 identifies an audience with audience attributes that correspond to (e.g., match) attributes of the end user and assigns the corresponding audience identification to the end user.

Based on determining the audience identification 608 associated with the end user, the user experience design system 102 utilizes the audience manager 205 to determine audience attributes associated with the end user. Indeed, the user experience design system 102 accesses audience information within the audience information database 206 that indicates demographic information, interests, and/or other information associated with the particular audience identification of the end user.

In addition, the user experience design system 102 generates (or accesses from the audience information database 206) a personalization rule 610 based on the audience information associated with the end user. Indeed, as described above, the user experience design system 102 determines a personalization rule that defines one or more design elements and/or corresponding element characteristics for modifying the appearance of a user interface (e.g., a webpage design template and/or a product storefront webpage) for a particular audience.

Accordingly, based on determining the personalization rule 610 that corresponds to the audience identification 608, the user experience design system 102 generates a personalized product storefront webpage 612. In particular, the user experience design system 102 accesses, for presentation to the user via the end-user application 606, the personalized product storefront webpage 612. The personalized product storefront webpage 612 includes design elements and element characteristics customized according to the personalization rule 610. Thus, the user experience design system 102 presents a customized version of a product storefront webpage (e.g., the product storefront webpage 212) for the end user belonging to a particular audience. Likewise, the user experience design system 102 generates personalization rules and corresponding personalized product storefront webpages for a number of different audiences.

Figure 7A:
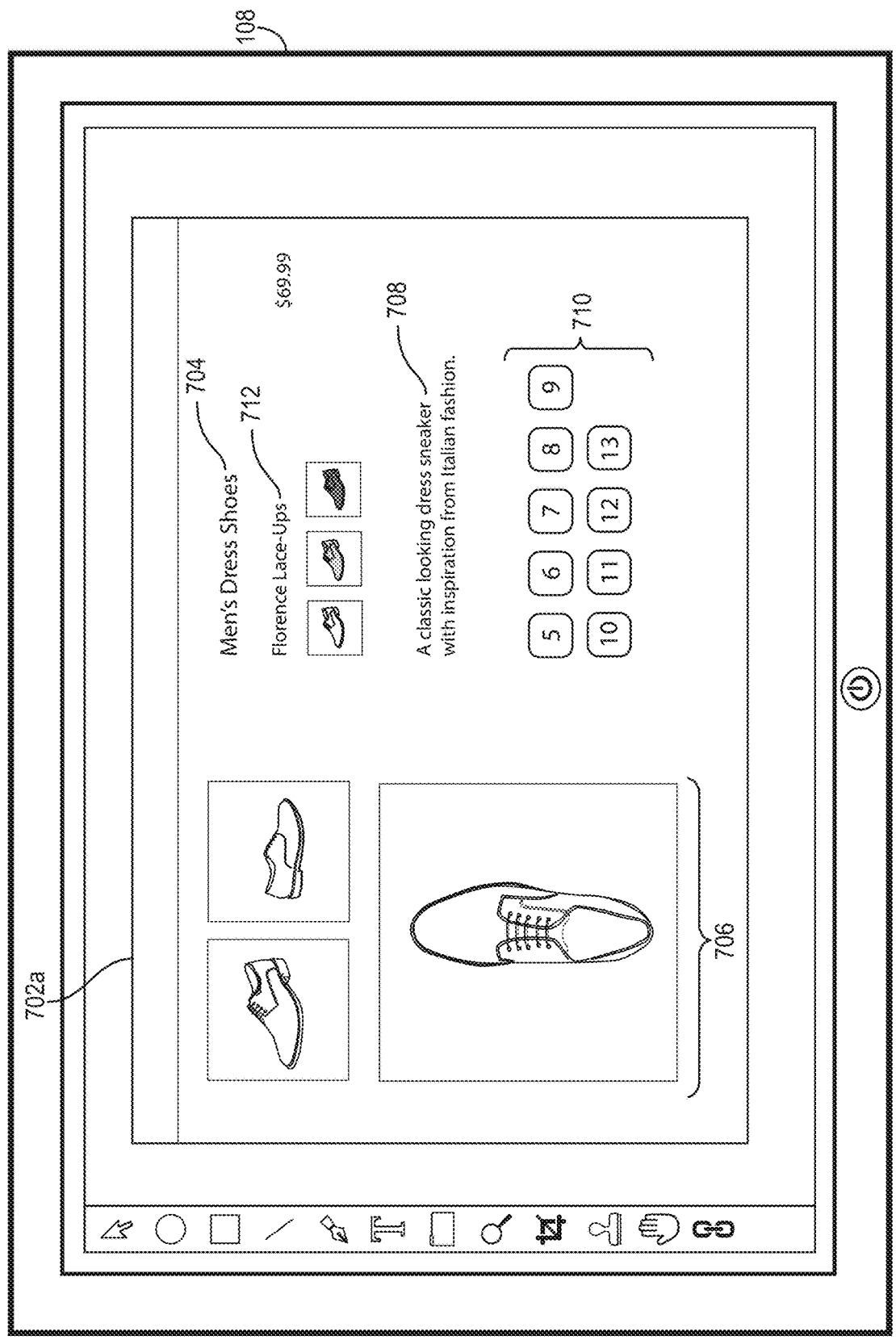
FIGS. 7A-7B illustrate example webpage designs based on different personalization rules in accordance with one or more embodiments.
Figure 7B:
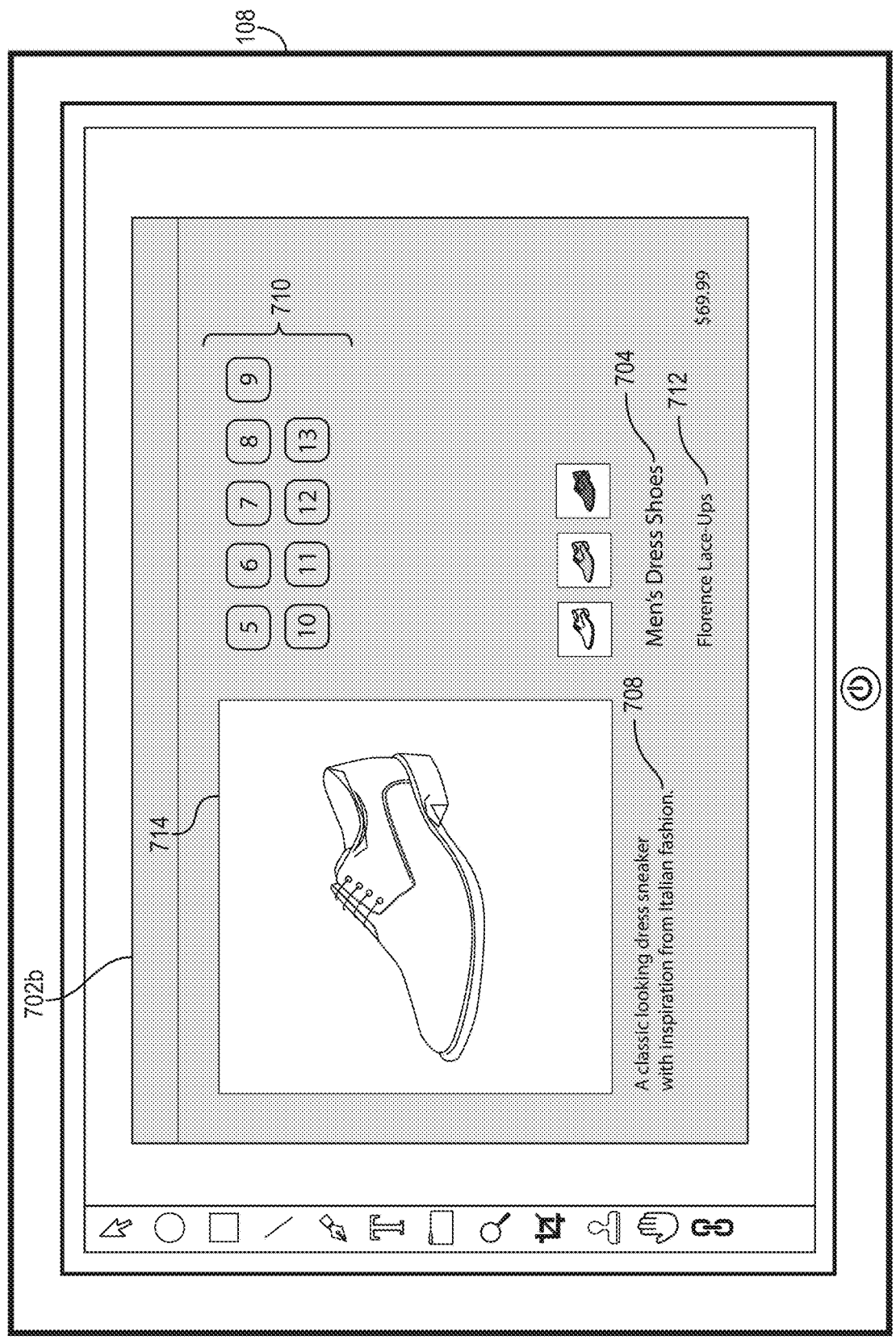

As mentioned, the user experience design system 102 presents personalized storefront webpages based on personalization rules. FIGS. 7A and 7B illustrate webpage designs 702a and 702b, respectively, based on different personalization rules for different audience. Indeed, FIG. 7A corresponds to a first audience while FIG. 7B corresponds to a second audience, where the user experience design system 102 generates different personalization rules for the first audience and the second audience. Further, the webpage designs 702a and 702b of FIGS. 7A and 7B can correspond to unpublished webpage design templates displayed to a designer user during the design process as well as (or in the alternative) published product storefront webpages displayed to end users after publishing.

As illustrated in FIG. 7A, the user experience design system 102 generates a webpage design 702a based on a first personalization rule. As shown, the webpage design 702a includes various design elements such as digital images 706, a product category 704, a product name 712, a product description 708, and various product sizes 710. The user experience design system 102 generates the webpage design 702a having a particular layout, color, and other characteristics associated with the constituent design elements location within the webpage design 702a. Indeed, based on the first personalization rule associated with the first audience, the user experience design system 102 generates the various design elements having the illustrated characteristics.

As illustrated in FIG. 7B, on the other hand, the user experience design system 102 generates a webpage design 702b based on a second personalization rule. As shown, the webpage design 702b includes various design elements having different characteristics from the design elements of the webpage design 702a. Indeed, based on the second personalization rule associated with the second audience, the user experience design system 102 generates the design elements such as the digital image 714, the product description 708, the product category 704, the product name 712, and the product sizes 710 having different coordinate locations, sizes, and other characteristics. Further, the user experience design system 102 generates the webpage design 702b with a different background color than the webpage design 702a, in accordance with the second personalization rule.

Figure 8:
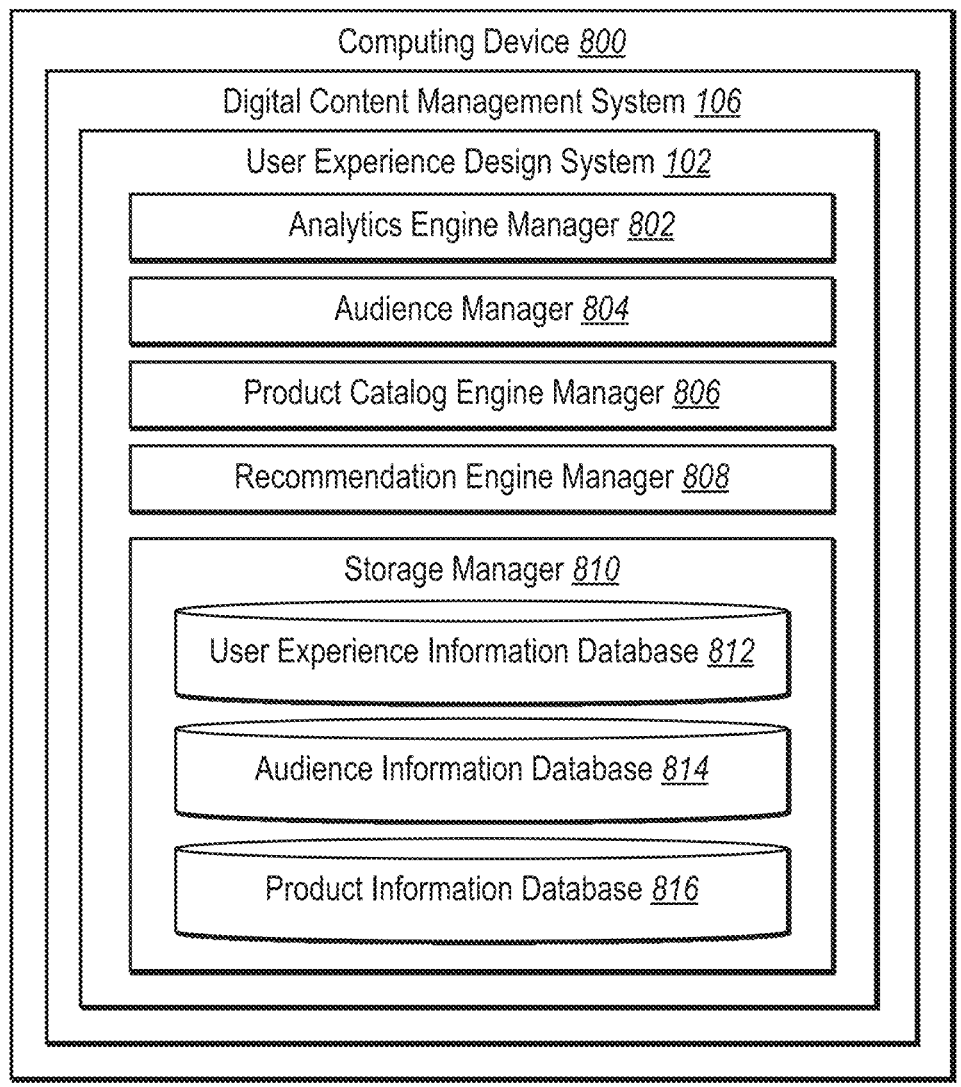
FIG. 8 illustrates a schematic diagram of a user experience design system in accordance with one or more embodiments.

Looking now to FIG. 8, additional detail will be provided regarding components and capabilities of the user experience design system 102. Specifically, FIG. 8 illustrates an example schematic diagram of the user experience design system 102 on an example computing device 800 (e.g., one or more of the client device 108 and/or the server(s) 104). As shown in FIG. 8, the user experience design system 102 may include an analytics engine manager 802, an audience manager 804, a product catalog engine manager 806, a recommendation engine manager 806, and a storage manager 810.

As just mentioned, the user experience design system 102 includes an analytics engine manager 802. The analytics engine manger 802 determines, accesses, receives, generates, manages, stores, and maintains user experience information. For example, the analytics engine manager 802 communicates with the storage manager 810 to access and store user experience information within the user experience information database 812. In addition, the analytics engine manager 802 generates user behavior metadata structures to indicate user experience information associated with specific products and/or design elements.

As mentioned, the user experience design system 102 includes an audience manager 804. The audience manager 804 determines, accesses, receives, generates, manages, stores, and maintains audience information. For example, the audience manager 804 communicates with the storage manager 810 to access and store audience information within the audience information database 814. In addition, the audience manager 804 generates personalization rules in the form of metadata structures to indicate audience attributes associated with various audiences.

As also mentioned, the user experience design system 102 includes a product catalog engine manager 806. The product catalog engine manager 806 determines, accesses, receives, generates, manages, stores, and maintains product information for one or more products. For example, the product catalog engine manager 806 communicates with the storage manager 810 to access and store product information within the product information database 816. In addition, the product catalog engine manager 806 generates a metadata structure that indicates, for a given product, a product identification and other product information associated with the product.

Additionally, the user experience design system 102 includes a recommendation engine manager 808. The recommendation engine manager 808 determines, accesses, receives, generates, manages, stores, and maintains recommendations for creating and/or modifying design elements. For example, the recommendation engine manager 808 generates recommendations to modify characteristics of design elements based on product information, audience information, and/or user experience information. Indeed, the recommendation manager 808 communicates with the storage manager to access product information, audience information, and/or user experience information to generate recommendations to modify the appearance of one or more design elements.

In one or more embodiments, each of the components of the user experience design system 102 are in communication with one another using any suitable communication technologies. Additionally, the components of the user experience design system 102 can be in communication with one or more other devices including one or more client devices described above. It will be recognized that although the components of the user experience design system 102 are shown to be separate in FIG. 8, any of the subcomponents may be combined into fewer components, such as into a single component, or divided into more components as may serve a particular implementation. Furthermore, although the components of FIG. 8 are described in connection with the user experience design system 102, at least some of the components for performing operations in conjunction with the user experience design system 102 described herein may be implemented on other devices within the environment.

The components of the user experience design system 102 can include software, hardware, or both. For example, the components of the user experience design system 102 can include one or more instructions stored on a computer-readable storage medium and executable by processors of one or more computing devices (e.g., the computing device 800). When executed by the one or more processors, the computer-executable instructions of the user experience design system 102 can cause the computing device 800 to perform the methods described herein. Alternatively, the components of the user experience design system 102 can comprise hardware, such as a special purpose processing device to perform a certain function or group of functions. Additionally or alternatively, the components of the user experience design system 102 can include a combination of computer-executable instructions and hardware.

Furthermore, the components of the user experience design system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the user experience design system 102 may be implemented as part of a stand-alone application on a personal computing device or a mobile device. Alternatively or additionally, the components of the user experience design system 102 may be implemented in any application that allows creation and delivery of marketing content to users, including, but not limited to, applications in ADOBE CREATIVE CLOUD or ADOBE MARKETING CLOUD, such as ADOBE ILLUSTRATOR, ADOBE PHOTOSHOP, ADOBE CAMPAIGN, and ADOBE ANALYTICS. "ADOBE," "ILLUSTRATOR," "PHOTOSHOP," "CAMPAIGN," and "ANALYTICS" are registered trademarks of Adobe Inc. in the United States and/or other countries.

FIGS. 1-8, the corresponding text, and the examples provide a number of different systems, methods, and non-transitory computer readable media for generating and publishing webpage design templates based on various types of information. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
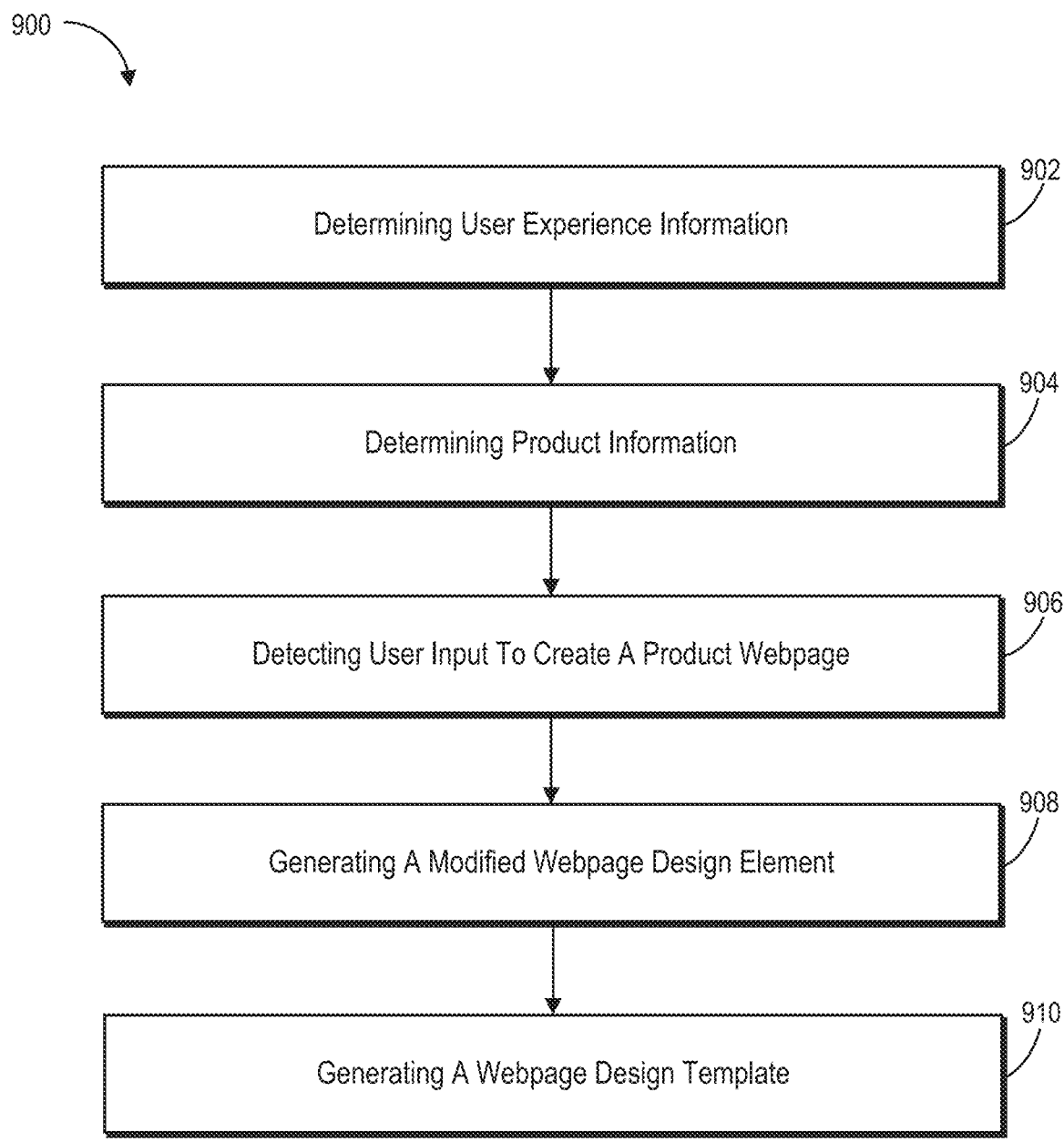
FIG. 9 illustrates a flowchart of a series of acts for generating a webpage design template in accordance with one or more embodiments.

While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 of generating a webpage design template. The series of acts 900 can include an act 902 of determining user experience information. In particular, the act 902 can involve determining, utilizing an analytics engine, user experience information associated with one or more webpage design elements. The act 902 can also (or alternatively) involve determining user experience information associated with one or more webpage design elements by utilizing an analytics engine to analyze user interactions with the one or more webpage design elements. The user experience information can include one or more of impressions, click-through rates, purchases, or element characteristics.

As shown, the series of acts 900 can include an act 904 of determining product information. The act 904 can involve determining, utilizing an internet-based product catalog engine, product information associated with one or more products. The product information can include one or more of a product name, a product description, a product price, a purchase history, or a product review.

In addition, the series of acts 900 can include an act 906 of detecting user input to create a product webpage. The act 906 can involve detecting user input to create a product webpage associated with the one or more products utilizing the one or more webpage design elements.

Further, the series of acts 900 can include an act 908 of generating a modified webpage design element. The act 908 can involve generating, in response to the detected user input, a modified webpage design element based on the user experience information and the product information. The act 908 can also (or alternatively) involve generating, in response to the detected user input, a modified webpage design element by determining a modification of an appearance a webpage design element based on the user experience information, the product information, and the audience information. In addition, the act 908 can involve determining, based on the user experience information and the product information, a modification to make to a characteristic of a webpage design element of the one or more webpage design elements and generating, based on the determined modification, a modified version of the webpage design element.

As illustrated, the series of acts can further include an act 910 of generating a webpage design template. The act 910 can involve generating, for display, a webpage design template comprising the modified webpage design element.

Although not illustrated in FIG. 9, the series of acts 900 can further include an act of generating a recommendation to modify a webpage design element based on one or more of the product information and the user experience information. Additionally, the series of acts 900 can include an act of determining, utilizing an audience manager, audience information for one or more audiences. Determining the audience information can involve utilizing an audience manager to analyze audience attributes. The audience information can include, for each audience of the one or more audiences, shared interests associated with users within the audience.

Further, the series of acts 900 can include an act of generating, based on the audience information, personalization rules associated with the one or more audiences as well as an act of modifying, based on the personalization rules, the webpage design template to have, for each of the one or more audiences, a corresponding appearance associated with the personalization rules. Indeed, the series of acts 900 can include an act of generating a recommendation to modify a webpage design element based on one or more of the product information, the user experience information, or the audience information. The series of acts 900 can further include an act of publishing the webpage design template as a product storefront webpage. Additionally, the series of acts 900 can include an act of determining a target audience from the one or more audiences.

Figure 10:
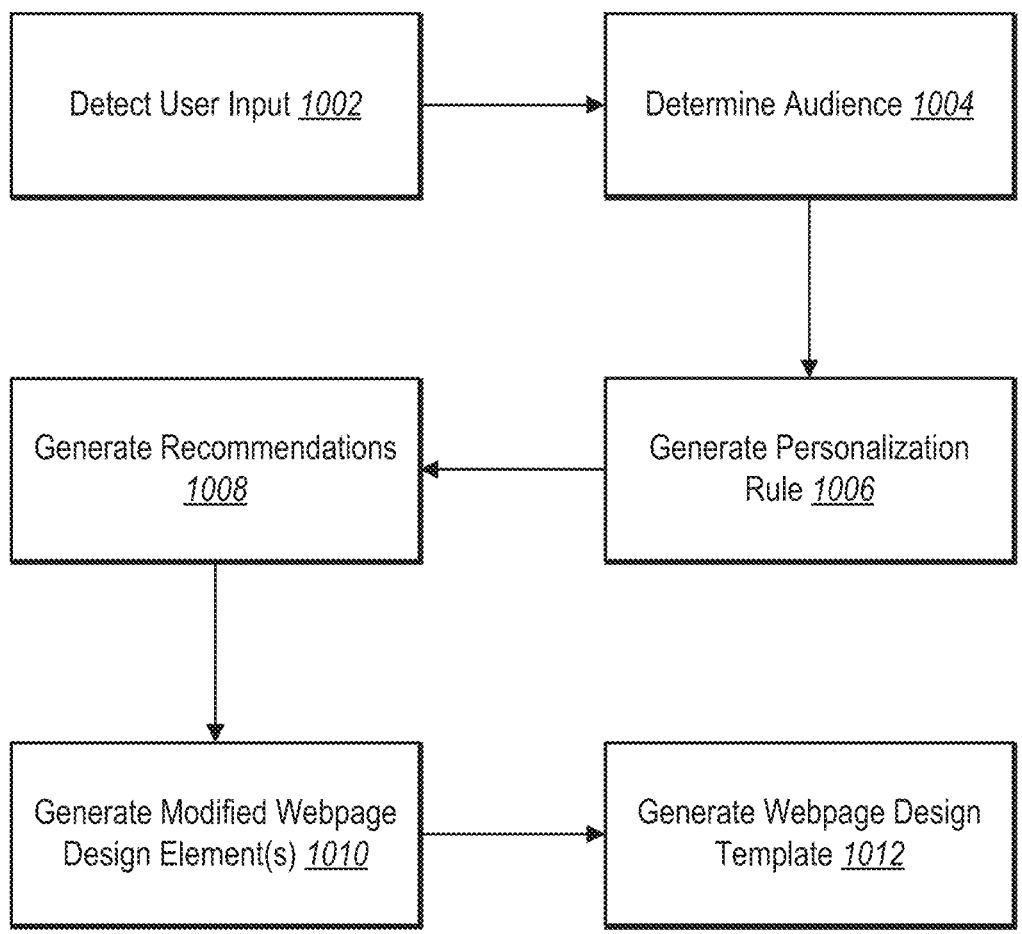
FIG. 10 illustrates a flowchart of a series of acts in a step for generating a webpage design template based on the user experience information and the product information in accordance with one or more embodiments.

As mentioned, the user experience design system 102 can perform a step for generating a webpage design template based on the user experience information and the product information. Indeed, FIG. 10 illustrates a series of acts 1002-1012 included in the step for generating a webpage design template based on the user experience information and the product information.

As shown, the user experience design system 102 performs an act 1002 to detect user input. In particular, the user experience design system 102 detects a user input from a designer user to create a product webpage. For example, the user experience design system 102 receives a user input via the client application 110 to create or modify a webpage design element to include within a webpage design template.

As further illustrated, the user experience design system 102 further performs an act 1004 to determine audiences associated with the end users. For example, the user experience design system 102 receives user input from the designer user to generate a product webpage that is personalized in appearance for different audiences. Indeed, the user experience design system 102 utilizes an audience manager 205 to determine an audience identification and corresponding audience attributes for the various audiences.

Thus, the user experience design system 102 performs an act 1006 to generate personalization rules for the different audiences. Based on the personalization rules, the user experience design system 102 customizes the appearance of the webpage design template by modifying design element characteristics, as described above.

Additionally, the user experience design system 102 performs an act 1008 to generate recommendations based on personalization rules as well as product information and user experience information. Indeed, the user experience design system 102 generates recommendations to modify design elements based on preferences of particular audiences and/or based on space requirements of various product information, among other factors as described above.

As further illustrated in FIG. 10, the user experience design system 102 performs an act 1010 to generate one or more modified webpage design elements. In particular, the user experience design system 102 generates modified design elements based on recommended modifications. In some embodiments, the user experience design system 102 automatically (e.g., without additional user input) generates the modified design elements by applying the recommended modifications, while in other embodiments the user experience design system 102 receives user input from a designer user to then incorporating the recommended modifications before generating modified design elements.

Further, the user experience design system 102 performs an act 1012 to generate a webpage design template. In particular, the user experience design system 102 generates a webpage design template including one or more design elements (modified or otherwise) in accordance with personalization rules and/or generated recommendations. As described in further detail above, the user experience design system 102 generates the webpage design template to include actual product information to appear to the designer user like the published product webpage will appear to end users.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
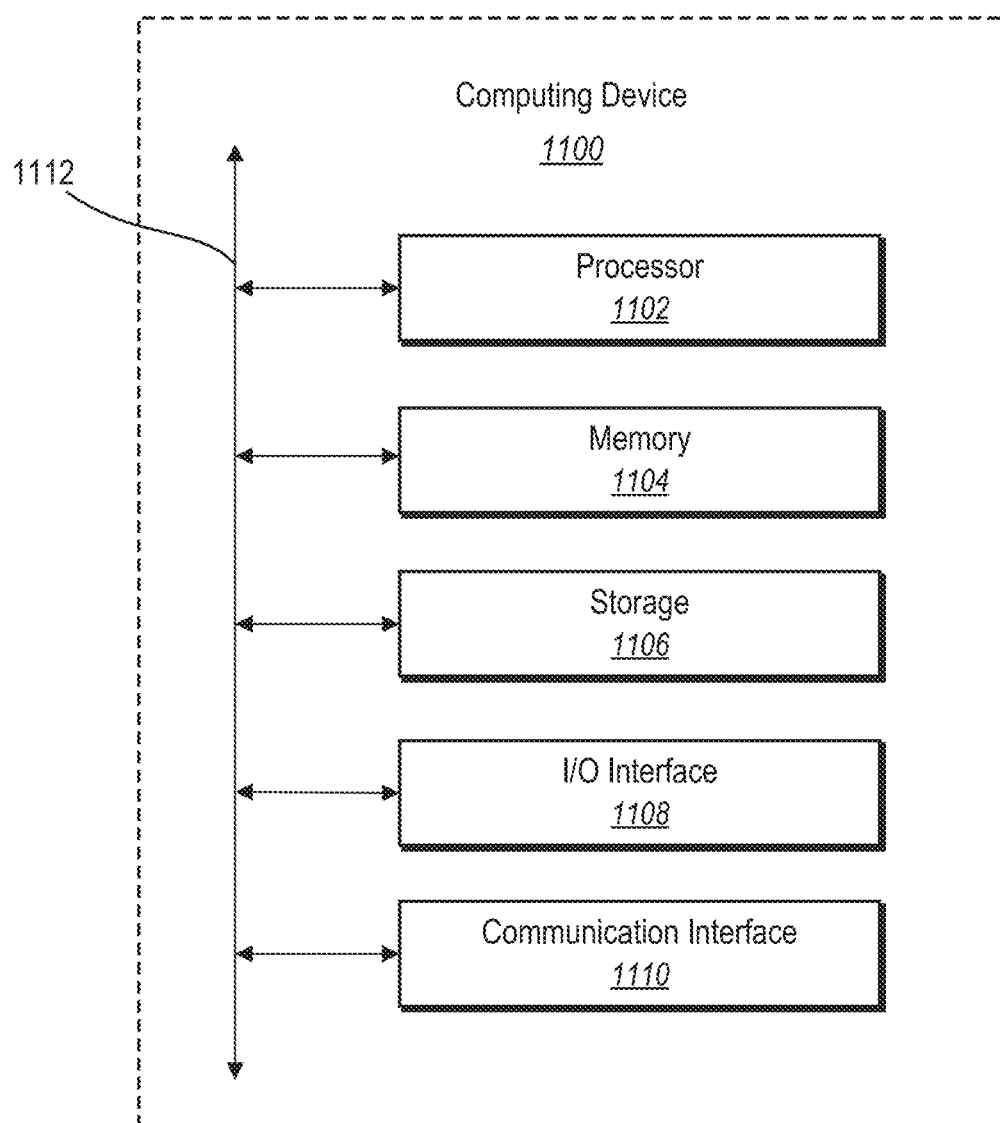
FIG. 11 illustrates a block diagram of an example computing device in accordance with one or more embodiments.

FIG. 11 illustrates, in block diagram form, an example computing device 1100 (e.g., the computing device 1100, the client device 108, and/or the server(s) 104) that may be configured to perform one or more of the processes described above. One will appreciate that the user experience design system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for creating interactive user experience interfaces, a computer-implemented method for generating product website templates by integrating analytics data and product-related data in a single design tool, the computer-implemented method comprising:

determining, by utilizing an analytics engine, user experience information associated with one or more webpage design elements;

determining, by utilizing an internet-based product catalog engine, product information associated with one or more products; and a step for generating a webpage design template based on the user experience information and the product information.

2. The computer-implemented method of claim 1, further comprising determining, by utilizing an audience manager, audience information associated with one or more audiences.

3. The computer-implemented method of claim 2, wherein the step for generating the webpage design template is further based on the audience information.

4. The computer-implemented method of claim 1, wherein the webpage design template comprises one or more recommended webpage design elements generated based on one or more of the user experience information or the product information.

5. A non-transitory computer readable medium comprising instructions that, when executed by at least one processor, cause a computer device to:
   determine, utilizing an analytics engine, user experience information associated with one or more webpage design elements;
   determine, utilizing an internet-based product catalog engine, product information associated with one or more products;
   detect user input to create a product webpage associated with the one or more products utilizing the one or more webpage design elements; and
   in response to the detected user input to create the product webpage, automatically:
      identify, from the one or more webpage design elements, a webpage design element to include as part of the product webpage by determining, from the user experience information, a predicted effectiveness of the webpage design element higher than a predicted effectiveness for another webpage design element;
      modify the webpage design element by adding one or more pieces of the product information to the webpage design element; and
      generate, for display, a webpage design template comprising the modified webpage design element.

6. The non-transitory computer readable medium of claim 5, wherein the instructions cause the computer device to modify the webpage design element by:
   determining, based on the user experience information and the product information, a modification to make to a characteristic of the webpage design element of the one or more webpage design elements; and
   generating, based on the determined modification, a modified version of the webpage design element.

7. The non-transitory computer readable medium of claim 5, further comprising instructions that, when executed by the at least one processor, cause the computer device to generate a recommendation to modify the webpage design element based on one or more of the product information and the user experience information.

8. The non-transitory computer readable medium of claim 5, further comprising instructions that, when executed by the at least one processor, cause the computer device to determine, utilizing an audience manager, audience information for one or more audiences.

9. The non-transitory computer readable medium of claim 8, wherein the audience information comprises, for each audience of the one or more audiences, shared interests associated with users within the audience.

10. The non-transitory computer readable medium of claim 9, further comprising instructions that, when executed by the at least one processor, cause the computer device to:
   generate, based on the audience information, personalization rules associated with the one or more audiences; and
   modify, based on the personalization rules, the webpage design template to have, for each of the one or more audiences, a corresponding appearance associated with the personalization rules.

11. The non-transitory computer readable medium of claim 5, further comprising instructions that, when executed by the at least one processor, cause the computer device to publish the webpage design template as a product storefront webpage.

12. The non-transitory computer readable medium of claim 5, wherein the user experience information comprises one or more of impressions, click-through rates, purchases, views associated with the one or more products, opening of an email, performing a search, selecting an option, or other interactions associated with the one or more products.

13. The non-transitory computer readable medium of claim 5, wherein the product information comprises one or more of a product name, a product description, a product price, a purchase history, a product review, a product image, or other data associated with an actual product.

14. A system comprising:
   at least one processor; and
   a non-transitory computer readable medium comprising instructions that, when executed by the at least one processor, cause the system to:
      determine user experience information associated with one or more webpage design elements by utilizing an analytics engine to analyze user interactions with the one or more webpage design elements;
      utilize an Internet-based product catalog engine to generate product information associated with one or more products;
      determine audience information associated with one or more audiences by utilizing an audience manager to analyze audience attributes;
      detect user input to create a product webpage associated with the one or more products utilizing the one or more webpage design elements; and
      in response to the detected user input to create the product webpage, automatically:
         identify, from the one or more webpage design elements, a webpage design element to include as part of the product webpage by determining, from the user experience information, a predicted effectiveness of the webpage design element is higher than a predicted effectiveness for another webpage design element;
         modify the webpage design element by determining a modification of an appearance of the webpage design element based on the user experience information, the product information, and the audience information; and
         generate, for display, a webpage design template comprising the modified webpage design element.

15. The system of claim 14, further comprising instructions that, when executed by the at least one processor, cause the system to modify the webpage design element by:
   determining, based on the user experience information, the product information, and the audience information, a modification to make to a characteristic of the webpage design element of the one or more webpage design elements; and generating, based on the determined modification, a modified version of the webpage design element.

16. The system of claim 14, further comprising instructions that, when executed by the at least one processor, cause the system to publish the webpage design template as a product storefront webpage.

17. The system of claim 14, wherein the audience information comprises, for each audience of the one or more audiences, shared interests associated with users within the audience.

18. The system of claim 14, further comprising instructions that, when executed by the at least one processor, cause the system to determine a target audience from the one or more audiences.

19. The system of claim 14, further comprising instructions that, when executed by the at least one processor, cause the system to:

generate, based on the audience information, personalization rules associated with the one or more audiences; and modify, based on the personalization rules, the webpage design template to have, for each of the one or more audiences, a corresponding appearance associated with the personalization rules.

20. The system of claim 14, further comprising instructions that, when executed by the at least one processor, cause the system to generate a recommendation to modify the webpage design element based on one or more of the product information, the user experience information, or the audience information.

* * * * *